(12) United States Patent
Swier et al.

(10) Patent No.: US 12,037,462 B2
(45) Date of Patent: Jul. 16, 2024

(54) POLYOLEFIN-POLYDIORGANOSILOXANE BLOCK COPOLYMER AND METHOD FOR THE SYNTHESIS THEREOF

(71) Applicants: Dow Silicones Corporation, Midland, MI (US); Dow Global Technologies LLC, Midland, MI (US)

(72) Inventors: Steven Swier, Midland, MI (US); Phillip Hustad, St. Paul, MN (US); David Devore, Midland, MI (US); Zachary Kean, Bay City, MI (US); Liam Spencer, Manvel, TX (US); Jordan Reddel, Midland, MI (US); Bethany Neilson, Manvel, TX (US); John Bernard Horstman, Midland, MI (US); Ken Kawamoto, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 969 days.

(21) Appl. No.: 16/975,736

(22) PCT Filed: Feb. 22, 2019

(86) PCT No.: PCT/US2019/019081
§ 371 (c)(1),
(2) Date: Aug. 26, 2020

(87) PCT Pub. No.: WO2019/182720
PCT Pub. Date: Sep. 26, 2019

(65) Prior Publication Data
US 2020/0407512 A1   Dec. 31, 2020

Related U.S. Application Data

(60) Provisional application No. 62/644,826, filed on Mar. 19, 2018.

(51) Int. Cl.

| | |
|---|---|
| C08G 77/442 | (2006.01) |
| C08F 8/00 | (2006.01) |
| C08F 8/22 | (2006.01) |
| C08F 8/42 | (2006.01) |
| C08F 110/02 | (2006.01) |
| C08F 210/16 | (2006.01) |
| C08F 299/08 | (2006.01) |
| C08G 77/08 | (2006.01) |
| C08G 77/12 | (2006.01) |
| C08G 77/20 | (2006.01) |
| C08G 77/38 | (2006.01) |
| C08G 77/42 | (2006.01) |

(52) U.S. Cl.
CPC ............. *C08G 77/442* (2013.01); *C08F 8/22* (2013.01); *C08F 110/02* (2013.01); *C08F 210/16* (2013.01); *C08G 77/08* (2013.01); *C08G 77/12* (2013.01); *C08F 2810/40* (2013.01)

(58) Field of Classification Search
None
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,175,993 A | 3/1965 | Wayenberg |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,660,443 A | 5/1972 | Boissieras et al. |
| 3,663,649 A | 5/1972 | Wheeler, Jr. |
| 3,691,257 A | 9/1972 | Kendrick et al. |
| 3,814,730 A | 6/1974 | Karstedt |
| 3,989,668 A | 11/1976 | Lee et al. |
| 4,370,358 A | 1/1983 | Hayes et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,707,531 A | 11/1987 | Shirahata |
| 4,766,176 A | 8/1988 | Lee et al. |
| 4,774,310 A | 9/1988 | Butler |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,310,843 A | 5/1994 | Morita |

(Continued)

FOREIGN PATENT DOCUMENTS

| | | | |
|---|---|---|---|
| CN | 104672463 A | * | 6/2015 |
| EP | 0347895 | | 12/1989 |

(Continued)

OTHER PUBLICATIONS

Ayandele, et al.; Polyhedral Oligomeric Silsesquioxane (POSS)-Containing Polymer Nanocomposites; Nanomaterials 2012; 2: 445.
Bulsari et al., Hydrosilylation of impact polypropylene co-polymer in a twin-screw extruder. Journal of Elastomers & Plastics vol. 40 Issue 4 pp. 365-380, 2008.
Ciolino, A. E., et al. (2004). "Synthesis of polybutadiene-graft-poly(dimethylsiloxane) and polyethylene-graft-poly(dimethylsiloxane) copolymers with hydrosilylation reactions." Journal of Polymer Science Part A: Polymer Chemistry 42(12): 2920-2930.

(Continued)

*Primary Examiner* — Randy P Gulakowski
*Assistant Examiner* — Ha S Nguyen
(74) *Attorney, Agent, or Firm* — Catherine U. Brown

(57) ABSTRACT

A polyolefin-polydiorganosiloxane block copolymer may be prepared by Piers-Rubinsztajn reaction.

20 Claims, No Drawings

(56) References Cited

U.S. PATENT DOCUMENTS

| | | | |
|---|---|---|---|
| 5,578,690 A | 11/1996 | Marks et al. | |
| 5,744,541 A | 4/1998 | Sawaguchi et al. | |
| 5,854,356 A | 12/1998 | Bergstrom et al. | |
| 5,910,547 A | 6/1999 | Schwindeman et al. | |
| 6,084,030 A | 7/2000 | Janssen et al. | |
| 6,127,502 A | 10/2000 | Krahnke et al. | |
| 6,175,031 B1 | 1/2001 | Tachikawa | |
| 6,265,518 B1 | 7/2001 | Krahnke et al. | |
| 6,624,254 B1 | 9/2003 | Arriola et al. | |
| 6,753,438 B2 | 6/2004 | Taylor et al. | |
| 7,064,173 B2 | 6/2006 | Rubinsztajn et al. | |
| 7,087,686 B2 | 8/2006 | Britovsek et al. | |
| 7,148,370 B1 | 12/2006 | Rubinsztajn et al. | |
| 7,355,089 B2 | 4/2008 | Chang et al. | |
| 7,858,706 B2 | 12/2010 | Arriola et al. | |
| 8,017,693 B2 | 9/2011 | Makio et al. | |
| 8,053,529 B2 | 11/2011 | Carnahan et al. | |
| 8,058,373 B2 | 11/2011 | Stevens et al. | |
| 8,088,869 B2 | 1/2012 | Joseph et al. | |
| 8,426,519 B2 | 4/2013 | Cogen et al. | |
| 8,476,375 B2 | 7/2013 | Backer et al. | |
| 8,501,885 B2 | 8/2013 | Arriola | |
| 8,501,894 B2 | 8/2013 | Crowther et al. | |
| 8,569,417 B2 | 10/2013 | Backer et al. | |
| 8,580,073 B2 | 11/2013 | Behl | |
| 8,785,554 B2 | 7/2014 | Carnahan | |
| 8,835,548 B2 | 9/2014 | Esseghir et al. | |
| 8,859,709 B2 | 10/2014 | Katsoulis et al. | |
| 9,181,379 B2 | 11/2015 | Backer et al. | |
| 9,237,865 B2 | 1/2016 | Wang et al. | |
| 9,273,163 B2 | 3/2016 | Crowther et al. | |
| 9,388,265 B2 | 7/2016 | Burns et al. | |
| 9,441,079 B2 | 9/2016 | Yang et al. | |
| 9,493,615 B2 | 11/2016 | Backer et al. | |
| 9,862,867 B2 | 1/2018 | Gordon et al. | |
| 2003/0139287 A1* | 7/2003 | Deforth | C08G 77/08 502/202 |
| 2006/0155090 A1 | 7/2006 | Ferenz | |
| 2006/0199930 A1 | 9/2006 | Li Pi Shan et al. | |
| 2007/0167578 A1 | 7/2007 | Arriola et al. | |
| 2008/0311812 A1 | 12/2008 | Arriola et al. | |
| 2009/0042043 A1 | 2/2009 | Joseph et al. | |
| 2009/0156776 A1 | 6/2009 | Chojnowski | |
| 2010/0029705 A1 | 2/2010 | Lin et al. | |
| 2010/0181092 A1 | 7/2010 | Cree et al. | |
| 2011/0172367 A1 | 7/2011 | Backer et al. | |
| 2012/0178867 A1 | 7/2012 | Esseghir et al. | |
| 2012/0283388 A1 | 11/2012 | Backer et al. | |
| 2014/0161858 A1 | 6/2014 | Mays et al. | |
| 2015/0247007 A1* | 9/2015 | Yang | C08G 77/442 525/106 |
| 2015/0376482 A1 | 12/2015 | Bekemeier et al. | |
| 2016/0200909 A1 | 7/2016 | Chang et al. | |
| 2016/0376482 A1 | 12/2016 | Morgeneyer et al. | |
| 2017/0133121 A1* | 5/2017 | Yu | C08L 23/16 |
| 2020/0157286 A1 | 5/2020 | Swier et al. | |

FOREIGN PATENT DOCUMENTS

| | | |
|---|---|---|
| EP | 1907495 | 4/2008 |
| JP | 07278309 | 10/1995 |
| JP | 03015444 | 3/2000 |
| JP | 2000226411 | 8/2000 |
| JP | 05230078 | 7/2013 |
| WO | 19970047665 | 12/1997 |
| WO | 19980033842 | 8/1998 |
| WO | 20020081551 | 10/2002 |
| WO | 2003093349 | 11/2003 |
| WO | 2003093369 | 11/2003 |
| WO | 2004037941 | 5/2004 |
| WO | 2005090426 | 9/2005 |
| WO | 2005090427 | 9/2005 |
| WO | 20070008765 | 1/2007 |
| WO | 2007035485 | 3/2007 |
| WO | 2009012215 | 1/2009 |
| WO | 20110032172 | 3/2011 |
| WO | 20110073047 | 7/2011 |
| WO | 2012103080 | 8/2012 |
| WO | 2014105411 | 7/2014 |
| WO | 2015000851 | 1/2015 |
| WO | 2015017068 | 2/2015 |
| WO | 2017091720 | 6/2017 |
| WO | 2017173080 | 10/2017 |
| WO | 20190182718 | 9/2019 |
| WO | 20190182719 | 9/2019 |
| WO | 20190182721 | 9/2019 |
| WO | 20190182983 | 9/2019 |
| WO | 20190182986 | 9/2019 |
| WO | 20190182988 | 9/2019 |
| WO | 20190182992 | 9/2019 |
| WO | 20190182993 | 9/2019 |
| WO | 2020018159 | 1/2020 |

OTHER PUBLICATIONS

"Graiver., ""Graft and block copolymers with polysiloxane and vinyl polymersegments."" Silicon Chemistry. 2002, p. 107-120, vol. 1, No. 2. Norwell, Maine.".

Inoue, et al. Reactions of Organozinc Coordination Compounds. Journal of Organometallic Chemistry, p. 11-16.

Long et al. Surface characteristics of hydro silylated polypropylene. Journal of Applied Polymer Science. vol. 88, Issue 14, pp. 3117-3131 2003.

Louis., "Karstedt Catalyst-Catalyzed stepgrowthh co-polyaddition of 1, 9-decadiene and 1, 1, 3, 3,-tetramethyldisiloxane." Journal of Organometallic Chemistry. 2006, p. 2031-2036, vol. 691, No. 9. Elsevier, Amsterdam.

Malz, H. et al., Hydrosilylation of terminal Double Bonds. Polymer Engineering and Science, Dec. 1998, vol. 38, No. 12. p. 1976-1984.

"Niemczyk., ""Study of thermal properties of polyethylene and polypropylenenanocomposites with long alkyl chain-substituted POSS fillers."" J. Them Anal Calorim. 2016, p. 1287-1299".

Rubinsztajn, et al., Macromolecules 2005, 38:1061. "A New polycondensation process for the preparation of bolysiloxane copolymers".

Rudin., "Modern Methods of Polymer Characterization." John Wiley & Sons. 1991, p. 103-112, New York.

Saam, J et al. Dow Corning. J. Am. Chem. Soc. (1961) 83(6) 1351.

Shearer et al., Free radical hydrosilylation of polypropylene. Journal of Applied Polymer Science. vol. 65, Issue 3, 139-447 (1997).

"Silicones", Apr. 15, 2003 (Apr. 15, 2003), Encyclopedia of Polymer Science and Techno, Wiley, US, pp. 765-841, XP007918236, pp. 801-805.

Spanos, et al., surface segregation, Macromolecules, 2003, 36 (2), pp. 368-372.

Tolinski, M.; Additives for Polyolefins 2015, chapter 7, p. 71.

Uozumi., "Synthesis of Functionalized Alternating Olefin Copolymer and Modificationto Graft Copolymer by Hydrosilylation."2000, p. 923-1292.

Waddon., "Crystal Structure of Polyhedral OligomericSilsequioxane (POSS) Nano-materials: A Study by X-rayDiffraction and Electron Microscopy." 2003, p. 4555-4561, vol. 15.

Waddon., "Nanostructured Polyethylene-POSSCopolymers: Control of Crystallizationand Aggregation." 2002, p. 1149-1155, vol. 2, No. 10.

Zhang, H X, et al, "Prepareation and properties of propylene/POSS copolymer with rac-Et (Ind) 2ZrX12 catalyst", European Polymer Journal, Pergamon Press Ltd. Oxford, GB, vol. 45, No. 1, Jan. 1, 2009 (Jan. 1, 2009), pp. 40-46, XP025869132.

Zheng, et al.; Novel Polyolefin Nanocomposites; Macromolecules 2001; 34, 8034-8039.

Zhou, et al., "Palladium-Catalyzed Negishi Cross-Coupling Reactions of Unactivated Alkyl Iodides, Bromides, Chlorides, and Tosylates"; J. Am, Chem, Soc., vol. 125, No. 41, 2003, p. 12627-12630.

(56) References Cited

OTHER PUBLICATIONS

Office Action Report Letter from corresponding Japanese Application No. 2020-549797 dated Mar. 9, 2023.

* cited by examiner

POLYOLEFIN-POLYDIORGANOSILOXANE BLOCK COPOLYMER AND METHOD FOR THE SYNTHESIS THEREOF

CROSS REFERENCE TO RELATED APPLICATIONS

This application is a U.S. national stage filing under 35 U.S.C. § 371 of PCT Application No. PCT/US19/019081 filed on 22 Feb. 2019, currently pending, which claims the benefit of U.S. Provisional Patent Application No. 62/644,826 filed 19 Mar. 2018 under 35 U.S.C. § 119 (e). PCT Application No. PCT/US19/019081 and U.S. Provisional Patent Application No. 62/644,826 are hereby incorporated by reference.

TECHNICAL FIELD

Polyolefin (A)-polyorganosiloxane (B) block copolymers and methods for the synthesis thereof are described herein. More particularly methods for the synthesis of block copolymers with architectures polyolefin-polyorganosiloxane (AB), polyolefin-polyorganosiloxane-polyolefin (ABA), polyorganosiloxane-polyolefin-polyorganosiloxane (BAB), and copolymers comprising $(AB)_n$ architectures, where subscript n represents a number of repeating polyolefin-polyorganosiloxane segments, are described herein.

BACKGROUND

Block copolymers of polyolefins and polyorganosiloxanes have a range of applications owing to their combinations of properties from the block structure, including the ability to modify the surface of finished plastic parts for friction management, improved mar resistance and wear resistance, and as process aids to increase melt flow for cycle time reduction. Additionally, these block copolymers can be used as thermoplastic elastomers, particularly those with ABA triblock and $(AB)_n$ architectures.

Chain shuttling technology of The Dow Chemical Company provides a useful mechanism to form multiblock olefin block copolymers (OBCs) as well as OBCs with controlled block sequence distribution. In addition, chain shuttling technology can enable the synthesis of relatively exotic end-functional polyolefins. This technology involves polymerization of olefins in presence of a metal alkyl chain shuttling agent (CSA) such as diethyl zinc. If a large excess of the chain shuttling agent is utilized, the majority of chains initiated from the alkyl group from the CSA result in the majority of the chains functionalized by the CSA on one end while the other is bound to a metal cation. These polymeryl metals can either be further functionalized to produce a chain-end functional polyolefin derived at the metal cation chain end, or the complex can by hydrolyzed to leave a functional group on the opposite end, which was grown off of the CSA.

It is desirable to connect these silicon-containing functional groups to polyorganosiloxanes via a linking group. The linking group can be a symmetric chain end, an inert chain end, or a chain end bound to an orthogonally reactive functional group. The polyorganosiloxane and the polyolefin may be (mono)-end-functional or di-end-functional. Therefore, the resulting product can be a diblock (AB) polymer, a triblock (ABA or BAB) polymer, a multiblock $(AB)_n$ polymer, or a mixture thereof.

In previously reported attempts to react an Si—H functional polyorganosiloxane with an alkenyl-terminated polyolefin, the catalyst caused undesired isomerization of the double bond to an internal position, thus deactivating it to hydrosilylation and limiting conversion. This led to copolymers containing unreacted homopolymers, limiting their industrial applicability.

SUMMARY OF THE INVENTION

A method for preparing a polyolefin-polydiorganosiloxane block copolymer (copolymer) comprises:
1) combining starting materials comprising:
   A) a polyolefin having 1 to 2 terminal silyl groups per molecule, where the terminal silyl group has formula

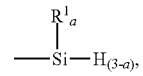

where each $R^1$ is an independently selected monovalent hydrocarbyl group and subscript a is 1 or 2 (silyl terminated polyolefin),
   B) a substantially linear polydiorganosiloxane having 1 to 2 hydrolyzable substituents (as described herein for $R^2$) capable of undergoing reaction with a silicon bonded hydrogen atom; and
   C) a Lewis Acid catalyst.

DETAILED DESCRIPTION OF THE INVENTION

The method for preparing the polyolefin-polydiorganosiloxane block copolymer comprises:
1) combining starting materials comprising:
   A) the polyolefin having 1 to 2 terminal silyl groups per molecule as described above,
   B) the polydiorganosiloxane having 1 to 2 hydrolyzable substituents capable of undergoing reaction with a silicon bonded hydrogen atom; and
   C) the Lewis Acid catalyst.

The starting materials may optionally further comprise one or more additional starting materials selected from the group consisting of D) a solvent, E) an alkoxysilyl-functional organosilicon compound having at least one silicon bonded hydrogen atom, and both D) and E).

Step 1) may be performed by any convenient means such as mixing at a temperature of 50° C. to 200° C., alternatively 100° C. to 120° C., at ambient pressure. Step 1) may be performed by any convenient means, such as solution processing (i.e., dissolving and/or dispersing the other starting materials in D) the solvent and heating) or melt extrusion (e.g., when solvent is not used or is removed during processing).

The method may optionally further comprise one or more additional steps. For example, the method may further comprise: 2) recovering the polyolefin-polydiorganosiloxane block copolymer after step 1). Recovering may be performed by any convenient means such as stripping and/or distillation to unwanted materials, e.g., catalyst, by-products, and/or unreacted starting materials. Alternatively, recovering may be performed by precipitation of the polyolefin-polydiorganosiloxane block copolymer in a non-solvent, thereby removing unwanted materials, optionally with water washing.

A) Silyl Terminated Polyolefin

Starting material A) is a polyolefin having 1 to 2 terminal silyl groups per molecule (silyl terminated polyolefin). The terminal silyl group has formula (A1):

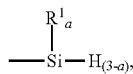

where each $R^1$ is an independently selected monovalent hydrocarbyl group and each subscript a is independently 1 or 2. Suitable monovalent hydrocarbyl groups for $R^1$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the hydrocarbyl groups for $R^1$ may be selected from the group consisting of alkyl groups, alkenyl groups and aryl groups; alternatively alkyl and aryl; and alternatively alkyl. The alkyl groups are exemplified by methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbyl groups of 6 or more carbon atoms including cycloalkyl groups such as cyclopentyl and cyclohexyl. The alkenyl groups are exemplified by, but not limited to, vinyl, allyl, butenyl (including n-butenyl, iso-butenyl and t-butenyl), and hexenyl (including linear and branched isomers thereof). The aryl groups are exemplified by cyclopentadienyl, phenyl, tolyl, xylyl, anthracenyl, benzyl, 1-phenylethyl, 2-phenylethyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, each $R^1$ may be independently selected from the group consisting of alkyl and aryl, alternatively methyl and phenyl. Alternatively, each $R^1$ may be methyl.

Alternatively, the silyl terminated polyolefin may have unit formula (A2):

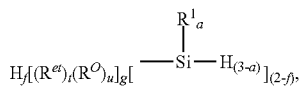

where subscript a and $R^1$ are as described above, subscript f is 0 to 1, subscripts t and u have relative values such that $0<t\leq 1$, $0\leq u\leq 1$, subscript g is 1 or more, each $R^{et}$ represents an ethylene unit, and each $R^O$ represents an olefin unit, other than ethylene. $R^O$ may be an alpha-olefin or a cyclic olefin. Examples of alpha-olefins are as described below and include ethylene, propylene, and octene. Examples of cyclic olefins are as described below and include ethylidenenorbornene, norbornene, vinyl norbornene, cyclohexene, and cyclopentene. Alternatively, subscript g may be 1 to 500, alternatively 10 to 400, and alternatively 18 to 360. Alternatively, subscript g may have a value sufficient to give the silyl terminated polyolefin a Mn of 500 to 50,000 g/mol, alternatively 500 to 10,000 g/mol.

Alternatively, the silyl terminated polyolefin may have unit formula (A3):

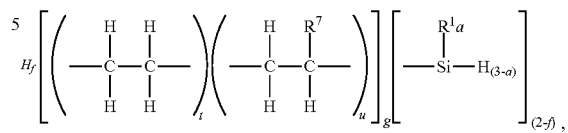

where subscripts a, f, g, t, and u, and $R^1$ are as described above. Each $R^7$ is independently a monovalent hydrocarbyl group of 2 to 20 carbon atoms. The monovalent hydrocarbyl group for $R^7$ may be alkyl, alkenyl or aryl; alternatively alkyl. Alternatively, $R^7$ may be an alkyl group of 2 to 12 carbon atoms, and alternatively 2 to 6 carbon atoms. Alternatively, each $R^7$ is a hexyl group.

Starting material A), the silyl terminated polyolefin, may have one terminal silyl group per molecule (i.e., where subscript f=1). Examples of this silyl-terminated polyolefin having a silyl group at one end of the polymer chain include dimethyl,hydrogensilyl-terminated polyethylene; dimethyl, hydrogensilyl-terminated poly(ethylene/octene) copolymer; methyl, dihydrogensilyl-terminated polyethylene; methyl, dihydrogensilyl-terminated poly(ethylene/octene) copolymer; diphenylhydrogensilyl-terminated polyethylene; diphenylhydrogensilyl-terminated poly(ethylene/octene) copolymer; phenyldihydrogensilyl-terminated polyethylene; phenyldihydrogensilyl-terminated poly(ethylene/octene) copolymer; chlorophenylhydrogensilyl-terminated polyethylene; or chlorophenylhydrogensilyl-terminated poly(ethylene/octene) copolymer. This silyl terminated polyolefin can be prepared by the processes described in co-pending U.S. Patent Application Ser. 62/644,635, filed on Mar. 19, 2018 and U.S. Patent Application Ser. No. 62/644,624 filed on Mar. 19, 2018, which are both hereby incorporated by reference.

The silyl terminated polyolefin having one terminal silyl group per molecule may be prepared by a process comprising: 1) combining starting materials comprising: a) a polymeryl-metal, optionally b) a nitrogen containing heterocycle, and c) a halosilane; thereby forming a product comprising the silyl-terminated polyolefin. The starting materials may optionally further comprise d) a solvent. The process may optionally further comprise one or more additional steps selected from: 2) washing the product with water, and 3) recovering the product. The a) polymeryl-metal may be prepared by a process comprising combining starting materials comprising: i) an olefin monomer, ii) a catalyst, and iii) a chain shuttling agent of formula $R^F{}_N M$, where M is a metal atom from group 1, 2, 12, or 13 of the Period Table of Elements, each $R^F$ is independently a monovalent hydrocarbyl group of 1 to 20 carbon atoms, and subscript N is 1 to the maximum valence of the metal selected for M. In certain embodiments, M may be a divalent metal, including but not limited to calcium (Ca), magnesium, and zinc (Zn), and in this embodiment subscript N=2. In certain embodiments, M may be a trivalent metal, including but not limited to aluminium (Al), boron (B), and gallium (Ga), and in this embodiment subscript N=3. Alternatively, M may be either Zn or Al; and alternatively Zn. The monovalent hydrocarbyl group of 1 to 20 carbon atoms may be alkyl group (as defined herein), alternatively exemplified by ethyl, propyl, octyl, and combinations thereof.

Suitable olefin monomers are disclosed for example, at col. 16, lines 5-36 of U.S. Pat. No. 7,858,706 and at col. 12, lines 7 to 41 of U.S. Pat. No. 8,053,529, which are hereby incorporated by reference. Examples of suitable olefin monomers include straight chain or branched alpha-olefins of 2 to 30 carbon atoms, alternatively 2 to 20 carbon atoms, such as ethylene, propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; cycloolefins of 3 to 30, alternatively 3 to 20 carbon atoms such as cyclopentene, cycloheptene, norbornene, 5-methyl-2-norbornene, tetracyclododecene, and 2-methyl-1,4,5,8-dimethano-1,2,3, 4,4a,5,8,8a-octahydronaphthalene. Alternatively, starting material i) may comprise ethylene and optionally one or more olefin monomers other than ethylene, such as propylene or 1-octene. Alternatively, the olefin monomer may be ethylene and 1-octene. Alternatively, the olefin monomer may be ethylene. Suitable catalysts (and optional cocatalysts) are disclosed, for example, at col. 19, line 45 to col. 51, line 29 of U.S. Pat. No. 7,858,706, and col. 16, line 37 to col. 48, line 17 of U.S. Pat. No. 8,053,529, which are hereby incorporated by reference. Suitable chain shuttling agents include trialkyl aluminium and dialkyl zinc compounds, such as triethylaluminium, tri(isopropyl)aluminium, tri(isobutyl)aluminium, tri(n-hexyl)aluminium, tri(n-octyl) aluminium, triethylgallium, and diethylzinc. Suitable chain shuttling agents are disclosed at col. 16, line 37 to col. 19, line 44 of U.S. Pat. No. 7,858,706 and col. 12, line 49 to col. 14, line 40 of U.S. Pat. No. 8,053,529, which are hereby incorporated by reference.

The polymeryl-metal useful for preparing the silyl terminated polyolefin may be prepared using known process conditions and equipment, such as those disclosed in U.S. Pat. No. 7,858,706 to Arriola, et al. at col. 52, line 2 to col. 57, line 21 and U.S. Pat. No. 8,053,529 to Carnahan, et al.

The optional nitrogen containing heterocycle may be added, for example, when the polymeryl-metal is a polymeryl-zinc and the halosilane is a chlorosilane. The optional nitrogen containing heterocycle may have a general formula selected from the group consisting of:

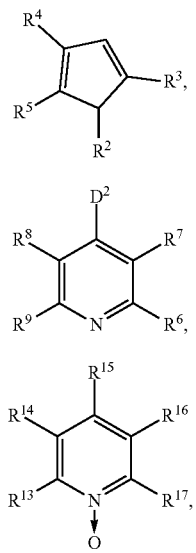

and mixtures of two or more of b1), b2), and b3), where in formulae b1), b2), and b3), where $R^2$ is a monovalent hydrocarbyl group, $R^3$ is a hydrogen atom or a monovalent hydrocarbyl group, $R^4$ is a hydrogen atom or a monovalent hydrocarbyl group, $R^5$ is a hydrogen atom or a monovalent hydrocarbyl group, $R^6$ is a hydrogen atom or a monovalent hydrocarbyl group, $R^7$ is a hydrogen atom or a monovalent hydrocarbyl group, $R^8$ is a hydrogen atom or a monovalent hydrocarbyl group, $R^9$ is a hydrogen atom or a monovalent hydrocarbyl group, and $D^2$ is an amino functional hydrocarbyl group or group of formula $-NR^{11}_2$, where each $R^{11}$ is a monovalent hydrocarbyl group, $R^{13}$ is a hydrogen atom or a monovalent hydrocarbyl group, $R^{14}$ is a hydrogen atom or a monovalent hydrocarbyl group, $R^{15}$ is a hydrogen atom or a monovalent hydrocarbyl group, $R^{16}$ is a hydrogen atom or a monovalent hydrocarbyl group, and $R^{17}$ is a hydrogen atom or a monovalent hydrocarbyl group. Suitable hydrocarbyl groups for $R^2$ to $R^{17}$ may have 1 to 12 carbon atoms, alternatively 1 to 8 carbon atoms, alternatively 1 to 4 carbon atoms, and alternatively 1 to 2 carbon atoms. Alternatively, the hydrocarbyl groups for $R^2$ to $R^{17}$ may be alkyl groups. The alkyl groups are exemplified by methyl, ethyl, propyl (including branched and linear isomers thereof), butyl (including branched and linear isomers thereof), and hexyl; alternatively methyl. Alternatively, each $R^3$ to $R^{10}$ may be selected from the group consisting of hydrogen and methyl. Alternatively, each $R^{13}$ to $R^{17}$ may be hydrogen. The nitrogen containing heterocycle used as the basic additive in the process may be selected from the group consisting of:

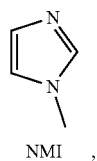

NMI ,

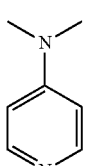

DMAP ,

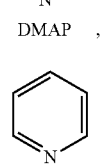

pyridine N-oxide, and mixtures of two or more of b4), b5), and b6).

When the nitrogen containing heterocycle is used, the resulting product may be recovered, e.g., by water washing to remove the nitrogen containing heterocycle before using the silyl-terminated polyolefin in the method for preparing the polyolefin-polydiorganosiloxane block copolymer described herein.

The halosilane may have formula $H_JR^{12}_K SiX_{(4-J-K)}$, where each $R^{12}$ is independently selected from hydrogen and a monovalent hydrocarbyl group of 1 to 18 carbon atoms, each X is independently a halogen atom, subscript J is 1 to 3, subscript K is 0 to 2, with the proviso that a quantity (J+K) 3. Examples of suitable halosilanes include, but are not limited to: dihalosilanes such as methylhydrogendichlorosilane, methylhydrogendiiodosilane, methylhydrogenchloroiodosilane, ethylhydrogendichlorosilane, ethylhydrogendibromosilane, ethylhydrogendiiodosilane, ethylhydrogenchloroiodosilane, propylhydrogendichlorosilane, propylhydrogendibromosilane, propylhydrogendiiodosilane, propylhydrogenchloroiodosilane, phenylhydrogendichlorosilane, phenylhydrogendiiodosilane, phenylhydrogendibromosilane, and mixtures thereof. Examples of suitable halosilanes further include, but are not limited to: monohalosilanes such as dimethylhydrogenchlorosilane, dimethylhydrogenbromosilane, dimethylhydrogeniodosilane, diethylhydrogenchlorosilane, diethylhydrogeniodosilane, dipropylhydrogenchlorosilane, dipropylhydrogenbromosilane, dipropylhydrogeniodosilane, diphenylhydrogenchlorosilane, diphenylhydrogeniodosilane, diphenylhydrogenbromosilane, and mixtures thereof. Alternatively, the halosilane may be selected from the group consisting of c1) dimethylhydrogenchlorosilane, c2) diphenylhydrogenchlorosilane, c3) phenyldihydrogenchlorosilane, c4) phenylhydrogendichlorosilane, c5) dimethylhydrogeniodosilane, and mixtures of two or more of c1), c2), c3), c4), and c5).

Starting material (d) a solvent may optionally be used in step 1) of the process for making the silyl terminated polyolefin. The solvent may be a hydrocarbon solvent such as an aromatic solvent or an isoparaffinic hydrocarbon solvent. Suitable solvents include but are not limited to a non-polar aliphatic or aromatic hydrocarbon solvent selected from the group of pentane, hexane, heptane, octane, nonane, decane, undecane, dodecane, cyclopentane, methylcyclopentane, cyclohexane, methylcyclohexane, cycloheptane, cyclooctane, decalin, benzene, toluene, xylene, an isoparaffinic fluid including but not limited to Isopar™ E, Isopar™ G, Isopar™ H, Isopar™ L, Isopar™ M, a dearomatized fluid including but not limited to Exxsol™ D or isomers and mixtures of two or more thereof. Alternatively, the solvent may be toluene and/or Isopar™ E.

Alternatively, starting material A), the silyl terminated polyolefin, may have two silyl terminal groups per molecule (i.e., in formulae (A2) and (A3) where subscript f=0, the silyl terminated polyolefin is telechelic. Such telechelic silyl terminated polyolefins may be prepared by methods, such as those disclosed in co-pending U.S. Patent Application Ser. No. 62/644,808, filed on Mar. 19, 2018, which is hereby incorporated by reference. Telechelic silyl terminated polyolefins may be prepared, for example, by a process comprising: 1) combining starting materials comprising a') a silicon-terminated organo-metal and c) the halosilane (as described above), thereby obtaining a product comprising the silyl-terminated polyolefin. In further embodiments, the starting materials of this process may further comprise b) the nitrogen containing heterocycle (as described above). The starting materials of this process may optionally further comprise d) the solvent (as described above).

The process may optionally further comprise one or more additional steps. For example, the process may further comprise: 2) recovering the telechelic silyl terminated polyolefin. Recovering may be performed by any suitable means, such as precipitation and filtration, optionally with water washing, thereby removing unwanted materials.

The amount of each starting material depends on various factors, including the specific selection of each starting material. However, in certain embodiments, a molar excess of starting material c) may be used per molar equivalent of starting material a'). For example, the amount of starting material c) may be 2 to 3 molar equivalents per molar equivalent of starting material a'). If starting material b) is used, the amount of starting material b) may be 2 molar equivalents per molar equivalent of starting material a').

The amount of d) solvent will depend on various factors, including the selection of starting materials a'), c), and, if present, b). However, the amount of d) solvent may be 65% to 95% based on combined weights of all starting materials used in step 1).

Starting material a') may be a silicon-terminated organo-metal having the formula (II) or (III):

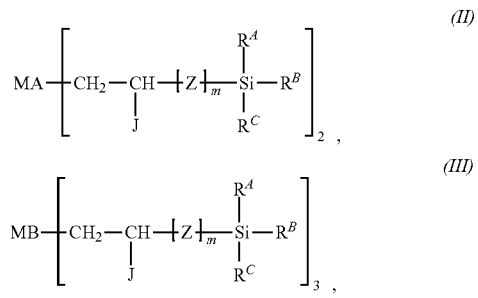

where
MA is a divalent metal selected from the group consisting of Zn, Mg, and Ca;
MB is a trivalent metal selected from the group consisting of Al, B, and Ga;
each Z is an independently selected divalent hydrocarbyl group of 1 to 20 carbon atoms; subscript m is a number from 1 to 100,000;
each J is independently a hydrogen atom or a monovalent hydrocarbyl group of 1 to 20 carbon atoms;
each $R^A$, $R^B$, and $R^C$ is independently selected from the group consisting of a hydrogen atom, a monovalent hydrocarbyl group of 1 to 10 carbon atoms, a vinyl group, an alkoxy group, or one or more siloxy units selected from M, D, and T units:

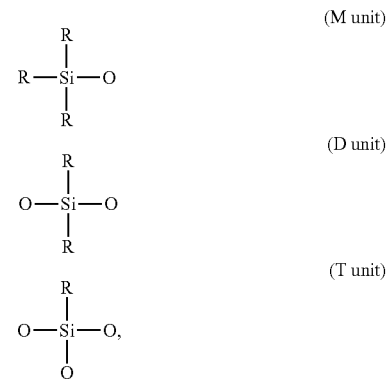

wherein each R is independently a hydrogen atom, a monovalent hydrocarbyl group of 1 to 10 carbon atoms, or cyclic, a vinyl group, or an alkoxy group;
two or all three of $R^A$, $R^B$, and $R^C$ may optionally be bonded together to form a ring structure when two or all three of $R^A$, $R^B$, and $R^C$ are each independently one or more siloxy units selected from D and T units.

In certain embodiments, subscript m of formulas (II) and (III) is a number from 1 to 75,000, from 1 to 50,000, from 1 to 25,000, from 1 to 10,000, from 1 to 5,000, from 1 to 2,500, and/or from 1 to 1,000.

In certain embodiments of formula (II), MA is Zn. In certain embodiments of formula (III), MB is Al. In further embodiments of formula (II), J is an ethyl group. In further embodiments of formula (III), J is a hydrogen atom.

Prior to this process, the silicon-terminated organo-metal may be prepared according to the disclosures of co-pending U.S. Patent Application Nos. 62/644,654 and 62/644,664 both filed on Mar. 19, 2018, which are both hereby incorporated by reference.

For example, in certain embodiments, the silicon-terminated organo-metal may be prepared by a process comprising combining starting materials comprising: (a) a vinyl-terminated silicon-based compound, (b) a chain shuttling agent, (c) a procatalyst, (d) an activator, (e) an optional solvent, and (f) an optional scavenger, thereby obtaining a product comprising the silicon-terminated organo-metal.

Alternatively, the silicon terminated organo-metal may be prepared by a process comprising combining starting materials at an elevated temperature, the starting materials comprising: (a) the vinyl-terminated silicon-based compound, (b) the chain shuttling agent, and optionally (e) the solvent. This process may be conducted at a temperature of 60° C. to 200° C., alternatively 80° C. to 180° C., and alternatively 100° C. to 150° C. This process may be conducted for a duration of from 30 minutes to 200 hours.

In certain embodiments, (a) the vinyl-terminated silicon-based compound may have the formula (IV):

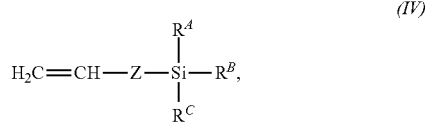

where Z, $R^A$, $R^B$, and $R^C$ are as described above.

In certain embodiments, the (b) chain shuttling agent may have the formula $R^F{}_N M$, where $R^F$, M and subscript N are as described above.

In certain embodiments, (c) the procatalyst may be any compound or combination of compounds capable of, when combined with an activator, polymerization of unsaturated monomers. Suitable procatalysts include but are not limited to those disclosed in WO 2005/090426, WO 2005/090427, WO 2007/035485, WO 2009/012215, WO 2014/105411, WO 2017/173080, U.S. Patent Publication Nos. 2006/0199930, 2007/0167578, 2008/0311812, and U.S. Pat. Nos. 7,355,089 B2, 8,058,373 B2, and 8,785,554 B2. The nitrogen containing heterocycle and the halosilane are as described above for starting materials b) and c) used to make the silyl terminated polyolefin having one terminal silyl group per molecule.

In certain embodiments, the (d) activator may be any compound or combination of compounds capable of activating a procatalyst to form an active catalyst composition or system. Suitable activators include but are not limited to Brønsted acids, Lewis acids, carbocationic species, or any activator known in the art, including but limited to those disclosed in WO 2005/090427 and U.S. Pat. No. 8,501,885 B2. In exemplary embodiments, the co-catalyst is $[(C_{16-18}H_{33-37})_2CH_3NH]$ tetrakis(pentafluorophenyl)borate salt.

In certain embodiments, the (e) optional solvent may be any solvent disclosed above as starting material (d) or as described below.

In further embodiments, the silicon-terminated organo-metal prepared by the processes described above may be followed by a subsequent polymerization step. Specifically, the silicon-terminated organo-metal prepared by the processes as described above may be combined with at least one olefin monomer, a procatalyst as defined herein, an activator as defined herein, and optional materials, such as solvents and/or scavengers, under polymerization process conditions known in the art, including but not limited to those disclosed in U.S. Pat. Nos. 7,858,706 and 8,053,529. Such a polymerization step essentially increases the subscript n in the formula (I) and the subscript m in formulas (II) and (III). Examples of suitable olefin monomers for use in the polymerization step are as described above.

As described below, the silicon-terminated organo-metal may also be prepared by combining starting materials comprising 6-bromo-1-hexene, THF, and chlorodimethylsilane (Me$_2$HSiCl) to form hex-5-en-1-yldimethylsilane, followed by combining hex-5-en-1-yldimethylsilane, triethylborane, a borane-dimethylsulfide complex, and diethyl zinc to form the silicon terminated organo-metal.

Alternatively, the silicon-terminated organo-metal may be prepared in a batch reactor using a process as described below in Reference Example 10, by varying appropriate starting materials, i.e., the olefin monomers, catalysts, chain shuttling agents, catalysts, procatalysts, activators, and solvents, suitable examples of which are described herein. Step 1) of combining the starting materials may be performed by any suitable means, such as mixing at a temperature of 50° C. to 200° C., alternatively 100° C. to 120° C., at ambient pressure. Heating may be performed under inert, dry conditions. In certain embodiments, step 1) of combining the starting materials may be performed for a duration of 30 minutes to 20 hours, alternatively 1 hour to 10 hours. In further embodiments, step 1) of combining the starting materials may be performed by solution processing (i.e., dissolving and/or dispersing the starting materials in (d) solvent and heating) or melt extrusion (e.g., when (d) solvent is not used or is removed during processing).

The silicon-terminated organo-metal prepared as described above for starting material (a') may then be combined with (c) the halosilane, and optionally (b) the nitrogen containing heterocycle, and/or (d) the solvent, which are as described above thereby producing the telechelic silyl terminated polyolefin.

Alternatively, the silyl terminated polyolefin suitable for use as starting material A) may be prepared in a solution polymerization process, wherein the polyolefin polymer is made by a method comprising: a) combining i) the olefin monomer, ii) the catalyst, and the iii) chain shuttling agent described above to prepare iv) a polymeryl metal; b) combining iv) the polymeryl-metal, v) the halosilane, and optionally v) the nitrogen containing heterocycle; where steps a) and b) are performed in a solution. In the solution, the resulting silyl terminated polyolefin may comprise 10% to 20% of the total weight of the reaction mixture. The balance typically comprises unreacted olefin monomer and an unreactive solvent. Commercial processes are typically done in a continuous reactor, where fresh olefin monomer and catalyst are continuously fed to reach a steady state conversion to polyolefin, and the polyolefin is removed at a rate commensurate with these feeds and the conversion to polyolefin. In these systems, the olefin monomer is not completely converted to polyolefin. For example, in the case of a copolymerization of ethylene and an alpha-olefin, the effluent from the reactor typically contains unreacted monomers, 10% of the ethylene and >50% of the alpha-olefin. After polymerization, the solvent and unreacted monomers may be removed by a devolatilization process to leave solid silyl terminated polyolefin.

After devolatilization of the silyl terminated polyolefin, the starting materials comprising the silyl terminated polyolefin, the polydiorganosiloxane, and the catalyst may be combined in step 1) of the method described above for making the polyolefin-polydiorganosiloxane block copolymer. Alternatively, the devolatilization step may be eliminated, i.e., the mixture formed after step b) may be used to deliver starting material A) the silyl terminated polyolefin in step 1) of the method described herein. This method for preparing the polyolefin-polydiorganosiloxane block copolymer described herein may provide the advantage that coupling the polydiorganosiloxane with the silyl terminated polyolefin may be conducted in the presence of the unreacted olefinic monomers (e.g., in solution, without the devolatilization of the silyl terminated polyolefin as described above). In this type of system, the polydiorganosiloxane could be fed into a second reactor along with the effluent from the continuous reactor described above for making the silyl terminated polyolefin. The chemistry in the second reactor would not involve reaction of the olefin and, therefore, it is expected this could be conducted in the presence of olefinic monomers without detrimental effect on coupling efficiency. This represents a benefit over prior processes, in which the unreacted monomer from the continuous reactor presented a challenge for doing the coupling through hydrosilylation in a second reactor before devolatilization. In this prior process, concentration of the free olefinic monomer was much higher than the concentration of a vinyl-terminated polyolefin, and therefore the coupling efficiency was poor between the siloxane and polyolefin, unless the olefin monomer was removed before this second reaction. The present invention may provide the benefit of enabling efficient coupling in a second reactor in solution, and then the resulting polyolefin-polydiorganosiloxane block copolymer may be devolatilized. Therefore, in one embodiment of the invention, the method may further comprise: i) forming A) the silyl terminated polyolefin described herein, in a mixture with unreacted monomer and optionally solvent, and ii) combining the mixture, B) the substantially linear polydiorganosiloxane described above, and C) the Lewis Acid catalyst in step 1) of the method described above.

Starting material A) may be one silyl terminated polyolefin or may comprise two or more silyl terminated polyolefins differing in at least one of the following properties: structure, viscosity, average molecular weight, olefin blocks, and sequence. Alternatively, starting material A) may comprise a mixture of silyl terminated polyolefins, wherein both the silyl terminated polyolefin having one terminal silyl group per molecule (mono-terminated silyl terminated polyolefin) and the telechelic silyl terminated polyolefin are used in the mixture for starting material A).

The amount of starting material A) used in step 1) of the method for making the copolymer described herein will depend on various factors including whether a mixture of mono-terminated silyl terminated polyolefin and telechelic silyl terminated polyolefin is used, the desired architecture of the polyolefin-polydiorganosiloxane block copolymer to be formed, and the selection of starting material B), however, the amount of starting material A) may be 5% to 95% based on combined weights of all starting materials combined in step 1). Alternatively, the amount of starting material A) may be 10% to 60%, and alternatively 10% to 40%, on the same basis.

B) Polydiorganosiloxane

In the method for making the copolymer, starting material B) is a polydiorganosiloxane having, per molecule, 1 to 2 hydrolyzable substituents capable of undergoing reaction with the silicon bonded hydrogen atom of starting material A). The polydiorganosiloxane is substantially linear, alternatively is linear.

Starting material B) may comprise a polydiorganosiloxane of formula (B1):

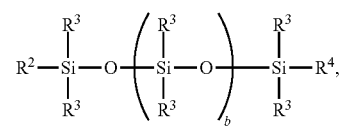

where each $R^2$ is independently a hydrolyzable substituent, each $R^3$ is independently a hydrogen atom or a monovalent organic group free of hydrolyzable functionality, $R^4$ is selected from $R^2$ and $R^3$, and subscript b is 0 or a positive number. Alternatively, subscript b has an average value of at least 2. Alternatively subscript b may be 2 to 2000. Alternatively, subscript b may be 10 to 1,000. Alternatively, subscript b may be 30 to 500.

The hydrolyzable substituents for $R^2$ may be any hydrolyzable substituent capable of reacting with the silicon bonded hydrogen atom of starting material A). Exemplary hydrolyzable substituents include halogen atoms such as chlorine or iodine; amido groups such as acetamido groups, benzamido groups, or methylacetamido groups; acyloxy groups such as acetoxy groups; hydrocarbonoxy groups such as alkoxy groups or alkenyloxy groups; amino groups; aminoxy groups; hydroxyl groups; mercapto groups; oximo groups; ketoximo groups; alkoxysilylhydrocarbylene-functional groups; or a combination thereof. Alternatively, each $R^2$ may be an alkoxy group. Alternatively, each $R^2$ may be selected from an alkoxy group and a hydroxyl group. Alternatively, each $R^2$ may be methoxy. Alternatively, each $R^2$ may be a hydroxyl group.

Suitable monovalent organic groups for $R^3$ include monovalent hydrocarbyl groups and monovalent halogenated hydrocarbyl groups. Examples of monovalent hydrocarbyl groups include, but are not limited to, alkyl such as those described above for $R^1$ and aryl such as those described above for $R^1$. Examples of monovalent halogenated hydrocarbon groups include, but are not limited to, chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of other monovalent organic groups include, but are not limited to, hydrocarbyl groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^3$ is a monovalent hydrocarbyl group exemplified by alkyl and aryl, alternatively methyl and phenyl.

In one embodiment, each $R^4$ is an $R^3$ group, as described above. Alternatively, each $R^4$ is an $R^2$ group, as described above. Alternatively, a mixture of polydiorganosiloxanes may be used as starting material B), wherein some instances of $R^4$ are $R^3$ and other instances of $R^4$ are $R^2$. Starting material B) may be one polydiorganosiloxane or may comprise two or more polyorganosiloxanes differing in at least one of the following properties: structure, viscosity, average molecular weight, siloxane units, and sequence. Starting material B) may comprise a polydiorganosiloxane such as
i) α,ω-dimethylhydroxylsiloxy-terminated, polydimethylsiloxane;
ii) α-dimethylhydroxylsiloxy-terminated, ω-trimethylsiloxy-terminated, polydimethylsiloxane;
iii) α,ω-dimethylhydroxylsiloxy-terminated poly(dimethylsiloxane/methylphenylsiloxane);
iv) α-dimethylhydroxylsiloxy-terminated, ω-trimethylsiloxy-terminated, poly(dimethylsiloxane/methylphenylsiloxane);
v) α,ω-(phenyl,methyl,hydroxyl-siloxy)-terminated, polydimethylsiloxane;
vi) α,ω-dimethylmethoxysiloxy-terminated polydimethylsiloxane;
vii) α-dimethylmethoxysiloxy-terminated, ω-trimethylsiloxy-terminated, polydimethylsiloxane;
viii) a combination of two or more of i), ii), iii), iv), v), vi), and vii).

Methods of preparing polydiorganosiloxanes suitable for use as starting material B), such as hydrolysis and condensation of the corresponding organohalosilanes or equilibration of cyclic polydiorganosiloxanes, are well known in the art.

The amount of starting material B) used in step 1) of the method described herein will depend on various factors including whether a mixture of mono-terminated and telechelic polydiorganosiloxanes is used, the desired architecture of the polyolefin-polydiorganosiloxane block copolymer to be formed, and the selection of starting materials A) and B), however, the amount of starting material B) may be 5% to 95% based on combined weights of all starting materials combined in step 1). Alternatively, the amount of starting material B) may be 10% to 60%, and alternatively 10% to 40%, on the same basis.

C) Catalyst

In the method for making the copolymer, starting material C), the catalyst, may be a Lewis Acid catalyst. Lewis Acid catalysts, such as those containing boron are suitable. Alternatively, the Lewis acid catalyst may be a trivalent boron compound with at least one perfluoroaryl group, alternatively 1 to 3 perfluoroaryl groups per molecule, alternatively 2 to 3 perfluoroaryl groups per molecule, and alternatively 3 perfluoroaryl groups per molecule. The perfluoroaryl groups may have 6 to 12 carbon atoms, alternatively 6 to 10, and alternatively 6 carbon atoms. For example, the Lewis Acid catalyst may be selected from $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})_B(C_6F_5)$; $(C_6F_5)_2B(OC_2H_5)$; or $(C_6F_5)_2B-CH_2CH_2Si(CH_3)$. Alternatively, starting material C) may be a Piers-Rubinsztajn reaction catalyst of formula $B(C_6F_5)_3$, tris(pentafluorophenyl)borane.

The amount of catalyst used in step 1) of the method described herein will depend on various factors including the selection of starting materials A) and B) and their respective contents of silicon bonded hydrogen atoms and hydrolyzable substituents and the temperature during step 1), however, the amount of catalyst is sufficient to catalyze reaction of starting materials comprising A) and B), alternatively the amount of catalyst is sufficient to provide 0.0001 to 0.1 molar equivalents of catalyst per molar equivalent of hydrolyzable substituents of starting material B), alternatively 0.001 to 0.1, and alternatively 0.005 to 0.05 molar equivalents, on the same basis.

D) Solvent

Starting material D) may optionally be added during the method for making the copolymer described above. The solvent may be an organic solvent, exemplified by D1) a ketone such as acetone, methylethyl ketone, or methyl isobutyl ketone; D2) an aromatic hydrocarbon such as benzene, toluene, or xylene; D3) an aliphatic hydrocarbon such as heptane, hexane, or octane; D4) a glycol ether such as propylene glycol methyl ether, dipropylene glycol methyl ether, propylene glycol n-butyl ether, propylene glycol n-propyl ether, or ethylene glycol n-butyl ether; D5) a halogenated hydrocarbon such as dichloromethane, 1,1,1-trichloroethane or methylene chloride; D6) chloroform; D7) dimethyl sulfoxide; D8) dimethyl formamide; D9) acetonitrile; D10) tetrahydrofuran; D11) white spirits; D12) mineral spirits; D13) naphtha; D14) an isoparaffin such as Isopar™ E commercially available from ExxonMobil Chemical Company, or a combination of two or more of D1), D2), D3), D4), D5), D6), D7), D8), D9), D10), D11), D12), D13, and D14).

The amount of solvent will depend on various factors including the type of solvent selected and the amount and type of other starting materials selected for use in step 1) of the method the polyolefin-polydiorganosiloxane block copolymer described herein. However, when present, the amount of solvent may range from 1% to 99%, alternatively 2% to 50%, based on combined weights of all starting materials combined in step 1). The solvent can be added during combining the starting materials comprising A), B), and C), for example, to aid mixing and delivery. Alternatively, one or more of the starting materials may be dissolved in the solvent before combining with the other starting materials in step 1) of the method described herein.

Starting Material E) Alkoxysilyl-functional Organosilicon Compound

Starting material E) is an alkoxysilyl-functional organosilicon compound having at least one silicon bonded hydrogen atom. Examples of suitable alkoxysilyl-functional organosilicon compounds are exemplified by alkoxy-functional organohydrogensiloxane oligomers of unit formula (E1):

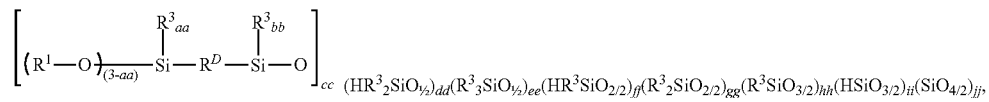

where $R^1$ and $R^3$ are as described above; each subscript aa is independently 0, 1, or 2; alternatively 0 or 1; each subscript bb is independently 0, 1, or 2; subscript cc>0; each $R^D$ is independently a divalent hydrocarbyl group of 2 to 18 carbon atoms; subscript dd≥0, subscript ee has a value such that 5≥ee≥0, subscript ff≥0, subscript gg≥0, subscript hh>0, subscript ii≥0, and subscript jj≥0, and a quantity (cc+dd+ee+ff+gg+hh+ii+jj)≤50. Suitable divalent hydrocarbyl groups for $R^D$ are exemplified by an alkylene group such as ethylene, propylene, butylene, or hexylene; an arylene group such as phenylene, or an alkylarylene group such as:

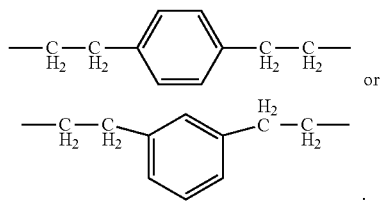

Alternatively, each $R^D$ is a group of formula $-C_2H_4-$. Examples of such alkoxy-functional organohydrogensiloxane oligomers may be prepared by the methods in U.S. Pat. No. 3,175,993 to Weyenberg and co-pending U.S. Provisional Patent Application Ser. Nos. 62/524,636, 62/524,637, and 62/524,639, all of which were filed on 26 Jun. 2017, and all of which are hereby incorporated by reference.

Alternatively, starting material E) may have formula (E2):

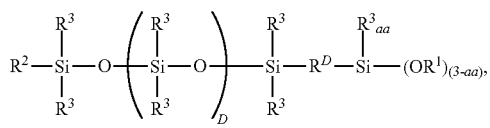

where $R^1$ $R^3$, $R^D$, and subscript aa are as described above, and subscript D is 0 to 20, alternatively 1 to 10.

Alternatively, starting material E) may have formula (E3):

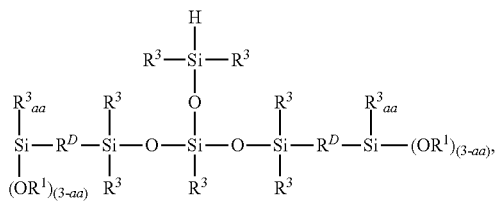

where $R^1$ $R^3$, $R^D$, and subscript aa are as described above.

Alternatively, starting material E) may comprise formula (E4), (E5), or both, where formula (E4) is

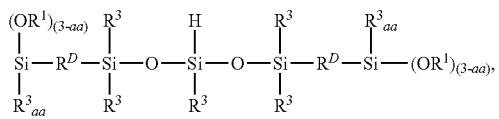

and formula (E5) is

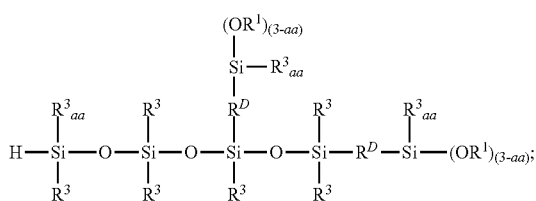

where $R^1$ $R^3$, $R^D$, and subscript aa are as described above.

Alternatively, starting material E) may have unit formula (E6): $(R^3_2SiO_{2/2})_E(R^3HSiO_{2/2})_F$

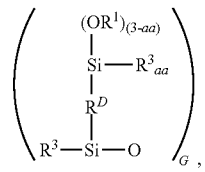

where $R^1$, $R^3$, $R^D$, and subscript aa are as described above, subscript E is 0 or more, subscript F is 1 or more, and subscript G is 1 or more and $4 \leq (E+F+G) \leq 50$.

In unit formula (I) for the polyolefin-polydiorganosiloxane block copolymer described herein, group $R^{10}$ forms as a reaction product of the silicon bonded hydrogen atom of starting material E) and a hydrolyzable substituent group of starting material B). When starting material E) is included, starting material B) comprises a telechelic polydiorganosiloxane. The amounts of starting materials B) and E) may be selected such that up to 1.05 molar equivalent of starting material E) to 1 molar equivalent of hydrolyzable substituents in the telechelic polydiorganosiloxane for starting material B) is present (E:B molar ratio). Alternatively, E:B molar ratio may be 1.05:1 to 1:1, for example, when a triblock copolymer with BAB architecture will be formed. In one embodiment, starting materials A), B), C), and E) may be combined concurrently in step 1). Alternatively, starting materials A), B) and C) may be combined in amounts such that one hydrolyzable substituent (from starting material B)) at a terminus of the polyolefin-polydiorganosiloxane block copolymer remains unreacted with the SiH from starting material A), and thereafter starting material E) is added such that the SiH on starting material E) reacts with the remaining hydrolyzable substituent from starting material B). In this manner, a copolymer with BAB architecture, or a copolymer with B(AB)n architecture may be prepared comprising alkoxy-silyl hydrocarbylene functional terminal groups.

Copolymer

The polyolefin-polydiorganosiloxane block copolymer prepared as described above comprises unit formula (I):

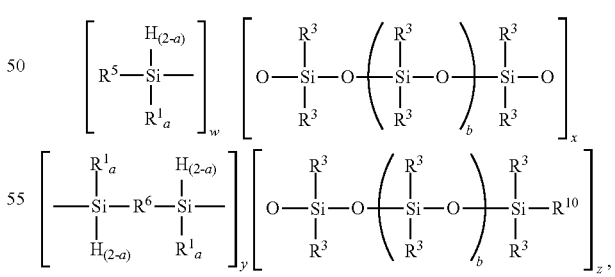

where $R^1$, $R^3$, subscript a, and subscript b are as described above.

Each $R^5$ is an independently selected hydrogen terminated polyolefinic block. Each $R^5$ may have unit formula: $H[(R^{et})_t(R^O)_u]_g$, where $R^{et}$, $R^O$, and subscripts t, u and g are as described above. Alternatively, each $R^5$ may have unit formula (II): $H[CH_2CH_2)_t(CHR^7CH_2)_u]_g$, where $R^7$ and subscripts t, u, and g are as described above. Alternatively, the hydrogen terminated polyolefinic block may be a hydrogen terminated ethylene polymeric block. Alternatively, the divalent polyolefinic block may be a hydrogen terminated ethylene-octene copolymeric block.

Each $R^6$ is an independently selected divalent polyolefinic block. Each $R^6$ may have unit formula $[(R^{et})_t(R^O)_u]_g$, where $R^{et}$, $R^O$, and subscripts t, u and g are as described above. Alternatively, each $R^6$ may have unit formula (III): $[(CH_2CH_2)_t(CHR^7CH_2)_u]_g$ where $R^7$ and subscripts t, u, and g are as described above. Alternatively, the divalent polyolefinic block may be a divalent ethylene polymeric block. Alternatively, the divalent polyolefinic block may be a divalent ethylene-octene copolymeric block.

Each $R^{10}$ is independently selected from $R^3$ and an alkoxysilyl functional hydrocarbylene containing group. In one embodiment, each $R^{10}$ is $R^3$ (i.e., when starting material E) is not used to prepare the polyolefin-polydiorganosiloxane block copolymer).

Alternatively, at least some instances of $R^{10}$ may have a formula selected from:

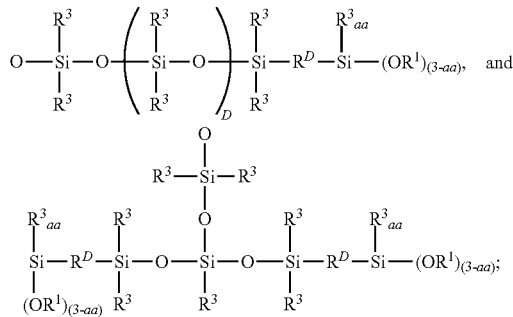

one or both of and

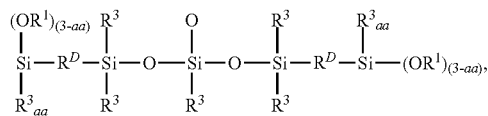

and

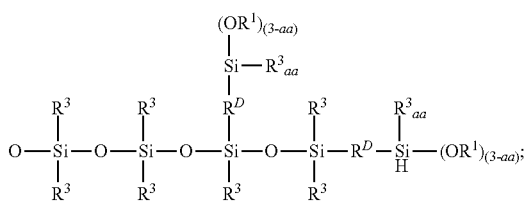

and $(R^3_2Si^O_{2/2})_E(R^3Si^O_{2/2})_{(F-1)}(R^3SiO_{3/2})$

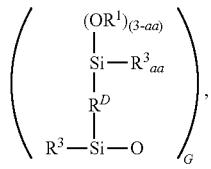

where $R^1$, $R^3$, $R^D$, and subscripts aa, D, E, F, and G are as described above.

In unit formula (I) above, subscript w is 0 to 2. Subscript x is 0 or a positive number. Subscript y is 0 or a positive number. Subscript z is 0 to 2. A quantity (w+y)≥1. A quantity (x+z)≥1. When subscript w=0, subscript z is >0. When subscript z=0, subscript w>0.

In one embodiment, in unit formula (I), subscript x=0, subscript y=0, subscript w=1 and subscript z=1. In this embodiment, the polyolefin-polydiorganosiloxane block copolymer has an AB architecture. In this embodiment, the copolymer has formula (IV):

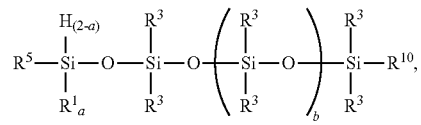

where $R^1$, $R^3$, $R^5$, $R^{10}$, subscript a, and subscript b are as described above.

In an alternative embodiment, in unit formula (I), subscript w=2, subscript z=0, subscript x≥1, and subscript y≥0. In this embodiment, the copolymer has formula (V):

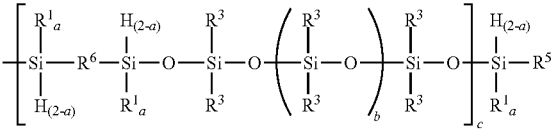

where $R^1$, $R^3$, $R^5$, $R^6$, subscript a, and subscript b are as described above; and subscript c is 0 or a positive number. Alternatively, subscript c may be 1 to 1,000; alternatively 2 to 1,000; alternatively 1 to 100, and alternatively 2 to 100. Alternatively, subscript c>0 in formula (V), i.e., when in unit formula (I), subscript w=2, subscript x>1, subscript y>1, and subscript z=0. Alternatively, when subscript c=0, the copolymer has an (ABA) architecture.

In an alternative embodiment, in unit formula (I), subscript w=2, subscript x=1, subscript y=0 and subscript z=0, and the copolymer has an (ABA) architecture. This copolymer has formula (VI):

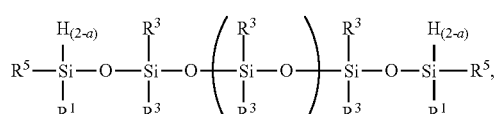

where $R^1$, $R^3$, $R^5$, subscript a, and subscript b are as described above. This copolymer can be made in the method described above where starting material A) has one silyl terminal group per molecule and starting material B) has two hydrolyzable substituents per molecule (telechelic).

In an alternative embodiment, in unit formula (I), subscript z=2, subscript w=0, subscript x≥0, and subscript y≥1, and the copolymer has formula (VII):

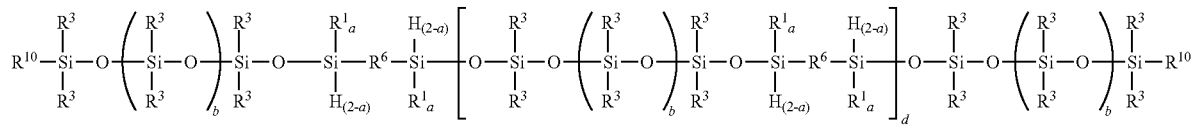

where $R^1$, $R^3$, $R^6$, $R^{10}$, subscript a, and subscript b are as described above; and subscript d is 0 or a positive number. Alternatively, subscript d may be 1 to 1,000; alternatively 2 to 1,000; alternatively 1 to 100, and alternatively 2 to 100. Alternatively, subscript d>0 in formula (VII), i.e., when in unit formula (I), subscript w=0, subscript x>1, subscript y>1, and subscript z=2. Alternatively, subscript d=0, and the copolymer has a (BAB) architecture.

In an alternative embodiment, in unit formula (I), subscript w=0, subscript x=1, subscript y=0 and subscript z=2, and the copolymer has formula (VIII):

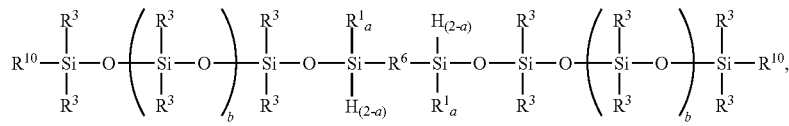

where $R^1$, $R^3$, $R^6$, $R^{10}$, subscript a, and subscript b are as described above. This copolymer can be made in the method described above where starting material B) has one hydrolyzable substituent per molecule, and starting material A) is telechelic.

Alternatively, any one of formulae (I) and (IV) to (VIII) may have one or more of: each $R^1$ being methyl and each $R^3$ being methyl. In this embodiment, each $R^5$ may be hydrogen terminated polyethylene or hydrogen terminated poly(ethylene/octene) and each $R^6$ may be polyethylene or poly(ethylene/octene).

EXAMPLES

These examples are intended to illustrate some embodiments of the invention and should not be interpreted as limiting the scope of the invention set forth in the claims.

A polyethylene-polydimethylsiloxane block copolymer with $(AB)_n$ architecture was prepared in this Example 1, as follows: 1.44 g (1 molar equiv.) of 63% telechelic Me$_2$HSi-terminated polyethylene ($M_n$: 1700) was brought into a nitrogen filled glovebox in a 100 mL jar with a stirbar. 3.3361 g (1.234 equiv, stoichiometry previously determined empirically to account for dead chain ends) of bis-silanol terminated polydimethylsiloxane having Mn of 4860 as measured by NMR (commercially available from Gelest: DMS-S21) was weighed directly into the vial inside the glovebox. 7.3 mL of toluene was added and the jar was heated to 103° C. in order to melt the polyethylene, and the jar was stirred gently to avoid splashing on the sidewalls. 350 μL of a 20 mg/mL toluene solution of tris(pentafluorophenyl)borane was added and immediate bubbling was observed. The cap was placed loosely on the jar to allow H$_2$ gas to evolve and the jar was heated at 100° C. overnight.

After running overnight, the reaction was cooled to room temperature and hardened. Isopropanol was added to the jar and the resulting copolymer was broken up with a spatula. The mixture was stirred vigorously to break up the pieces. Stirring was ceased and the copolymer was collected in a plastic disposable frit, then dried in a vacuum oven at 40° C. 4.50 g of material was collected. $^1$H-NMR indicated the complete consumption of the Si—H functionality. High temperature GPC in trichlorobenzene indicated approximately 6.5 repeating units of (polyethylene-polydimethylsiloxane).

A polyethylene-polydimethylsiloxane triblock copolymer with ABA architecture was prepared in this Example 2, as follows:

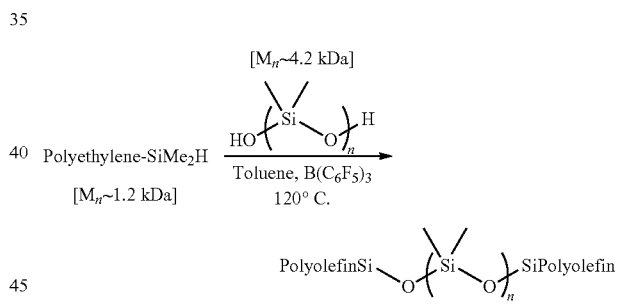

In a glove box: 150 mg of Polyethylene-SiMe$_2$H (mono terminated), 1.2 kDa, and 261 mg of telechelic hydroxyl-terminated PDMS (commercially available from Gelest as DMS-S21 oil, 1 molar equiv Si—OH) were heated to 120° C. Subsequently, 6 μL of a 100 mg/mL solution of tris (pentafluorophenyl)borane (0.01 molar equiv.) in toluene was added at which point the evolution of hydrogen was observed. The solution was stirred for 20 min then removed from the glovebox and precipitated into iPrOH and dried under high vacuum at 60° C. overnight to yield 415 mg of white waxy solid. The $^1$H NMR spectrum was consistent with the formation of the triblock copolymer.

A polyethylene-polydimethylsiloxane triblock copolymer with ABA architecture was prepared in this Example 3, as follows:

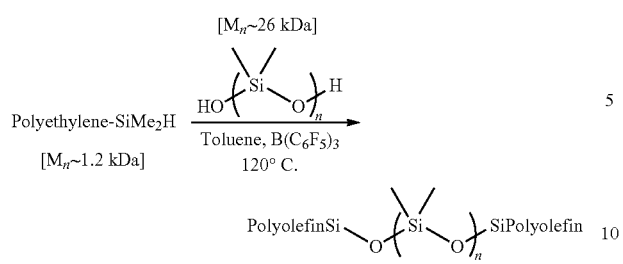

In a glove box: 150 mg of Polyethylene-SiMe₂H (mono terminated), 1.2 kDa, and 1.62 g of telechelic hydroxyl terminated PDMS (1 molar equiv Si—OH, DMS-S31) were heated to 120° C. Subsequently, 6 μL of a 100 mg/mL solution of tris(pentafluorophenyl)borane (0.01 molar equiv) in toluene was added. The solution was stirred for 20 min then removed from the glovebox and precipitated into iPrOH and dried under high vacuum at 60° C. overnight to yield 1.65 g of white waxy solid. The $^1$H NMR spectrum was consistent with the formation of the triblock copolymer, with no apparent residual SiH functionality as indicated by the disappearance of the SiH resonance at 4.04 ppm.

Reference Example 1—GPC Test Method

The copolymer samples prepared as described above (and the silyl terminated polyolefin samples prepared as described in the Reference Examples, below) were analyzed on a PolymerChar GPC-IR maintained at 160° C. Each sample was eluted through 1× Plgel 20 μm 50×7.5 mm guard column and 4× Plgel 20 μm Mixed A LS 300×7.5 mm columns with 1,2,4-trichlorobenzene (TCB) stabilized by 300 ppm of butylated hydroxyl toluene (BHT) at a flowrate of 1 mL/min. The 16 mg of sample was weighed out and diluted with 8 mL of TCB by the instrument. For molecular weight, a conventional calibration of polystyrene (PS) standards (Agilent PS-1 and PS-2) was used with apparent units adjusted to homo-polyethylene (PE) using known Mark-Houwink coefficients for PS and PE in TCB at this temperature. Decane was used as an internal flow marker and retention time was adjusted to this peak. For the comonomer incorporation, copolymers of known composition were used to develop a calibration curve for incorporation.

Silyl-terminated polyolefins used in the examples described above were prepared as described in the following Reference Examples.

Reference Example 2—Procedure for Silylation of Di-polyethylene-zinc with HMe₂SiCl Di-polyethylene-zinc and Isopar (Mw=1580 Da, 10 mM) were placed in a vial. The vial was heated at 120° C. until the contents became clear and homogeneous. dimethylhydrogenchlorosilane and NMI were added to the vial. The vial was heated at 90° C. for 3 hours. Iodine (I₂) was then added to quench unreacted di-polyethylene zinc. The resulting product was evaluated by $^1$H NMR. The molar equivalents of HMe₂SiCl and conversion to product results are shown below in Reference Table 2.

REFERENCE TABLE 2

| Entry | Equiv. Si—Cl | Silyl-polymer:Iodo-polymer |
|---|---|---|
| 1 | 2.0 | 75:25 |
| 2 | 8.0 | 90:10 |
| 3 | 10.0 | 90:10 |

Silyl:iodo ratio measured by $^1$H NMR Integrations

Reference Example 2 showed that when a relatively volatile chlorosilane was used, improved silylation was achievable with extra equivalents of the chlorosilane. Reference Example 3—Procedure for Silylation of Di-polyethylene-zinc with HPh₂SiCl Reference Example 2 was repeated, except that diphenylhydrogenchlorosilane was used instead of dimethylhydrogenchlorosilane. The results are shown below in Reference Table 3.

REFERENCE TABLE 3

| Entry | Equiv.NMI | Silyl-polymer:Iodo-polymer |
|---|---|---|
| 1 | 2.0 | 80:20 |
| 2 | 0 | <5:95 |
| 3 | 1.0 | 20:80 |
| 4 | 0.1 | 5:95 |

Silyl:iodo ratio measured by $^1$H NMR Integrations

Reference Example 3 showed that complete silylation of the di-polyethylene-zinc was possible using NMI as an additive.

Reference Example 4—Procedure for Silylation of Di-polyethylene-zinc with H₂PhSiCl Di-polyethylene-zinc and Isopar (Mw=1580 Da, 10 mM) were placed in a vial. The vial was heated at 120° C. until the contents became clear and homogeneous.

Phenyl,dihydrogen,chlorosilane and an additive (NMI or blend of NMI with TMEDA) were added to the vial. The vial was heated for a period of time. Iodine (I₂) was then added to quench unreacted di-polyethylene zinc. The resulting product was evaluated by $^1$H NMR. The molar equivalents of chlorosilane, of additive, the time and temperature for heating, and conversion to product results are shown below in Reference Table 4.

REFERENCE TABLE 4

Ph
|
H—Si—Cl    /\/\/\[ ]$_n$Zn[ ]$_n$/\/\/\    → N-methylimidazole then I$_2$
|
H
          0.5 equiv
          10 mM
          4.6 wt % isopar
          Mw = 1580 Da H$_2$PhSi/\/\/\[ ]$_n$    I$_2$PhSi/\/\/\[ ]$_n$    I/\/\/\[ ]$_n$

| Entry | Equiv.NMI | Equiv. Chlorosilane | temp. (° C.) | time (h) | Silyl-polymer:Iodo-polymer |
|---|---|---|---|---|---|
| 1 | 2.0 | 2.0 | 90 | 3 | >95:5 |
| 2 | 0.2 | 2.0 | 90 | 3 | 19:81 |
| 3 | 1.2 | 2.0 | 90 | 3 | >95:5 |
| 4 | 2.0 | 1.2 | 90 | 3 | >95:5 |
| 5 | 0.2 (0.55 equiv TMEDA) | 1.2 | 90 | 3 | 50:50 |
| 6 | 1.2 | 1.2 | 120 | 0.5 | >95:5 |

Silyl:iodo ratio measured by $^1$H NMR Integrations

Reference Example 4 showed that complete silylation with phenyl,dihydrogen,chlorosilane was observed with the conditions described in Entry 6. At least 1 equivalent of NMI was capable of completing the hydrosilylation. A blend of NMI and another amine base was used as the additive for comparative purposes in Entry 5.

Reference Example 5

Di-polyethylene-zinc and Isopar (Mw=1080 Da, 10 mM) were placed in a vial. The vial was heated at 120° C. until the contents became clear and homogeneous. Phenyl,dihydrogen,chlorosilane and an additive were added to the vial. The vial was heated at 100° C. for 1 hour. Iodine (I$_2$) was then added to quench unreacted di-polyethylene zinc. The resulting product was evaluated by $^1$H NMR. The additive and conversion to product results are shown below in Reference Table 5.

REFERENCE TABLE 5

Ph
|
H—Si—Cl    /\/\/\[ ]$_n$Zn[ ]$_n$/\/\/\    → 1.2 equiv additive / 100° C. 1 h, then I$_2$
|
Ph
1.2 equiv    0.5 equiv
             4.56 wt % isopar
             Mw = 1080 Da H$_2$PhSi/\/\/\[ ]$_n$    I$_2$PhSi/\/\/\[ ]$_n$    I/\/\/\[ ]$_n$

| Entry | Additive | Silyl-polymer:Iodo-polymer |
|---|---|---|
| 1 | TMAF | 51:49 |
| 2 | N-methyl-2-pyridone | 79:21 |
| 3 | DMPU | 89:11 |
| 4 | DMF | 53:47 |
| 5 | DMAP | >95:5 |
| 6 | Triethylamine | 36:64 |
| 7 | Pyridine N-oxide | >95:5 |
| 8 | none | 28:72 |

Silyl:iodo ratio measured by $^1$H NMR Integrations

Reference Example 5 showed that complete silylation was observed under the conditions tested using 4-dimethylaminopyridine, and pyridine-N-oxide as the additive. The example also showed that N-methyl pyridone and DMPU can also be used as the additive to promote silylation because as shown in Entry 2 and Entry 3, more silyl polymer formed than the comparative control (Entry 8) with no additive.

Reference Example 6

Reference Example 2 was repeated using phenylhydrogendichlorosilane (HPhSiCl2) instead of HMe$_2$SiCl and using 1.2 equivalents of NMI instead of 2 equivalents as the additive. The results are shown in Reference Table 6, below.

Ph
|
H—Si—Cl    /\/\/\[ ]$_n$Zn[ ]$_n$/\/\/\    → 1.2 equiv N-methylimidazole 90° C., 3 h, then I$_2$
|
Cl
             0.5 equiv
             10 mM
             4.6 wt % isopar
             Mw = 1580 Da ClHPhSi/\/\/\[ ]$_n$    ClHPhSi/\/\/\[ ]$_n$    I/\/\/\[ ]$_n$

| Entry | Equiv.Chlorosilane | Silyl-polymer:Iodo-polymer |
|---|---|---|
| 1 | 0.6 | 65:35 |
| 2 | 1.2 | 95:<5 |

Silyl:iodo ratio measured by $^1$H NMR Integrations

Reference Example 6 showed that substitution occurred at only one of the two Si—Cl bonds, even when the amount of phenylhydrogendichlorosilane was reduced.

Reference Example 7

Di-polyethylene-zinc and Isopar (Mw=1205 Da, 10 mM) were placed in a vial. The vial was heated at 120° C. until the contents became clear and homogeneous.

Dimethylhydrogeniodosilane and NMI were added to the vial. The vial was heated at 110° C. for 3 hours. Iodine (I$_2$) was then added to quench unreacted di-polyethylene zinc. The resulting product was evaluated by $^1$H NMR. The molar equivalents of HMe$_2$SiI and conversion to product results are shown below in Reference Table 7.

REFERENCE TABLE 7

| Entry | Equiv.NMI | Silyl-polymer:Iodo-polymer |
|---|---|---|
| 1 | 0.0 | 15:85 |
| 2 | 1.2 | 95:<5 |

Silyl:iodo ratio measured by $^1$H NMR Integrations

Reference Example 7 showed that NMI also promoted silylation with halosilanes other than chlorosilanes (e.g., iodosilanes). In the absence of NMI, the iodosilane was not electrophilic enough to undergo complete reaction with the dipolyethylene-zinc under the conditions tested in this example.

Reference Example 8

Silylation of an ethylene/octene polymeryl zinc with phenyldihydrogenchlorosilane was performed as follows. In a glovebox, a 20 mL vial was charged with the copolymerylzinc (Mn=1940 Da, 30.66% octene, 3.10% polymer in Isopar™ E, 14.95 g, 0.117 mmol, 0.500 equiv). The mixture was stirred and heated to 110° C. until the mixture became clear and homogeneous. NMI (22.5 μL, 0.282 mmol, 1.20 equiv) was added, followed by chlorophenylsilane (37.6 μL, 0.282 mmol, 1.20 equiv). The mixture was stirred for 1 hour. A portion of the solution was removed and quenched with an excess of iodine for conversion analysis. The polymer solution was poured into an excess of methanol, which precipitated polymer. The polymer was isolated by filtration and was dried in a vacuum oven.

Reference Example 9

This Reference Example 9 shows an optional water washing method that can be used to purify 850 g/mol Mn mono-SiH terminated polyethylene. 0.90 g of mono-SiH polyethylene prepared as described above was diluted to 10% in toluene in a 100 mL round bottom flask containing a magnetic stir bar. The solution was heated by placing the flask in an aluminum block at a temperature of 85° C. The mono-SiH terminated polyethylene dissolved. Deionized water (6 g) was added and mixed for 5 minutes. Stirring was then stopped, and the aqueous phase (on bottom) was removed using a plastic pipette. Excellent separation was achieved. Both phases were clear, and the pH of wash water was alkaline.

The following process was performed 7 times at 85° C. Deionized water (4 g) was added and mixed for 5 minutes. The aqueous phase was removed. The resulting solution of toluene and mono-SiH terminated polyolefin was poured onto a Teflon™ sheet to dry overnight. The pH of the final water wash was on the slightly acidic side, indicating that the imidazole was successfully removed.

Reference Example 10—General Procedure for Preparation of Silyl Terminated Organo-Metal Polymerizations were conducted in a 2 L PARR batch reactor. The reactor was heated by an electrical heating mantle and was cooled by an internal serpentine cooling coil containing cooling water. Both the reactor and the heating/cooling system were controlled and monitored by a CAMILE TG process computer. The bottom of the reactor was fitted with a dump valve, which emptied the reactor contents into a stainless steel dump pot. The dump pot was vented to a 30 gallon blow-down tank, with both the pot and the tank purged with nitrogen. All solvents used for polymerization or catalyst makeup were run through solvent purification columns to remove any impurities that may affect polymerization. The 1-octene, Isopar™ E, and toluene

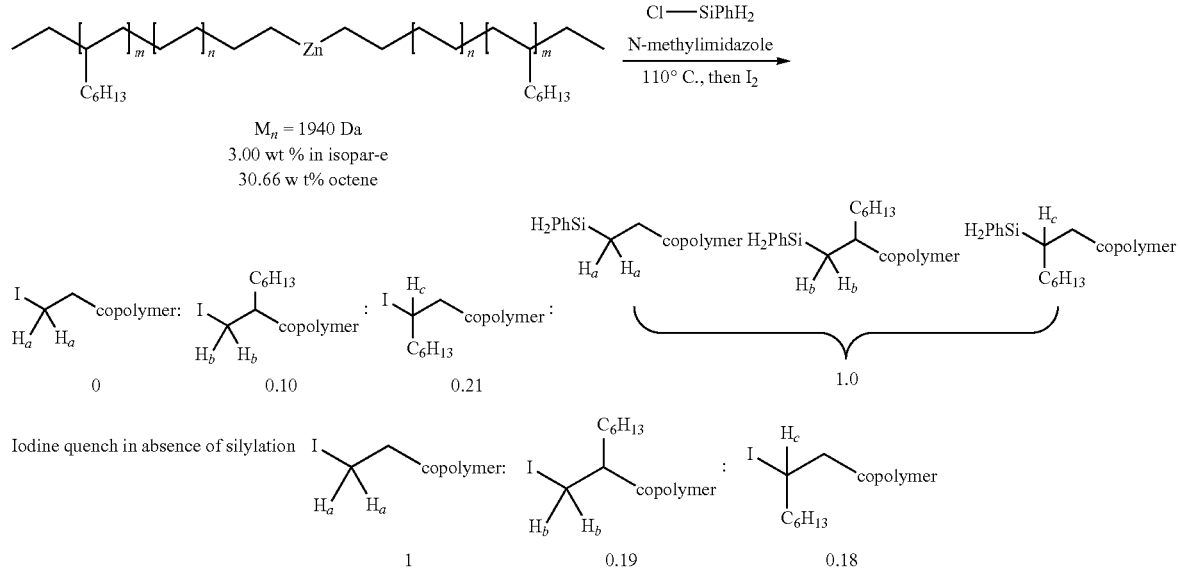

Reference Example 8 showed that silylation with an ethylene/octene copolymeryl-zinc is possible using NMI.

were passed through two columns, the first containing A2 alumina, the second containing Q5. The ethylene was passed through 2 columns, the first containing A204 alumina and 4 Å mol sieves, the second containing Q5 reactant. The nitrogen, used for transfers, was passed through a single column containing A204 alumina, 4 Å mol sieves and Q5.

The desired amount of Isopar™ E and/or toluene solvent and/or 1-octene was added via shot tank to the load column, depending on desired reactor load. The load column was filled to the load set points by use of a lab scale to which the load column was mounted. After liquid feed addition, the reactor was heated up to the polymerization temperature set point. If ethylene was used, it was added to the reactor when at reaction temperature to maintain reaction pressure set point. Ethylene addition amounts were monitored by a micro-motion flow meter.

The scavenger, MMAO-3A (which is commercially available from Akzo Nobel), was handled in an inert glove box, drawn into a syringe and pressure transferred into the catalyst shot tank. This was followed by 3 rinses of toluene, 5 mL each, before being injected into the reactor. The chain-shuttling agent was handled in an inert glove box, drawn into a syringe and pressure transferred into the catalyst shot tank. This was followed by 3 rinses of toluene, 5 mL each, before being injected into the reactor. The procatalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition, the run timer began. If ethylene was used, it was then added by the CAMILE to maintain reaction pressure set point in the reactor. These polymerizations were either run for 10 minutes, or a targeted ethylene uptake. The agitator was then stopped and the bottom dump valve opened to empty reactor contents into a clean dump pot that had been stored in a 130° C. oven for greater than 60 minutes before use to drive off any excess water absorbed by the metal surface. Once the contents of the reactor were emptied into the dump pot, the normal flow of nitrogen inerting was switched to argon, via a ball valve. The argon flowed for a calculated period of time to allow five exchanges of the volume of gas in the pot. When the argon inerting was complete, the dump pot was lowered from its fixture, and a secondary lid with inlet and outlet valves was sealed to the top of the pot. The pot was then inerted with argon for an additional five exchanges of gas, via a supply line and inlet/outlet valves. When complete, the valves were closed. The pot was then transferred to a glove box without the contents coming into contact with the outside atmosphere.

Reference Example 11—Preparation of Samples According to General Procedure of Reference Example 10

A homopolyethylene sample was prepared following the general procedure in Reference Example 10 using the following conditions: 120° C., 23 g of initial ethylene loaded, 600 g toluene, 10 μmol MMAO-3A, 1.2 eq. of activator to procatalyst. The amount of procatalyst used was adjusted to reach a desired efficiency. The reactor pressure and temperature was kept constant by feeding ethylene during the polymerization and cooling the reactor as needed. The polymerization was performed with bis(hydrogenated tallow alkyl)methylammonium tetrakis(pentafluorophenyl)borate as the activator, bis(N-isobutyl-6-mesitylpyridin-2-amine) dimethylhafnium as the procatalyst, and bis(8-(dimethylsilyl)octyl)zinc as the chain shuttling agent. $^1$H-NMR Mn: 1586 per chain, GPC Mn: 1310 per chain.

A poly(ethylene/octene) copolymer sample was prepared following the general procedure in Reference Example 10 using the following conditions: 120° C., 23 g of initial ethylene loaded, 397 g Isopar™ E, 115 g 1-octene, 10 μmol MMAO-3A, 1.2 eq. of activator to procatalyst. The amount of procatalyst used was adjusted to reach a desired efficiency. The reactor pressure and temperature was kept constant by feeding ethylene during the polymerization and cooling the reactor as needed. The polymerization was performed with bis(hydrogenated tallow alkyl)methylammonium tetrakis(pentafluorophenyl)borate as the activator, Preparation of [N-[2,6-Bis(1-methylethyl)phenyl]-α-[2-(1-methylethyl)-phenyl]-6-(1-naphthalenyl-C2)-2-pyridinemethanaminato]dimethylhafnium as the procatalyst, and bis(8-(dimethylsilyl)hexyl)zinc as the chain shuttling agent. GPC Mn: 25,020 per chain, Co-monomer incorporation: 48% 1-octene.

Reference Example 12—Preparation of a Telechelic Silyl Terminated Polyolefin

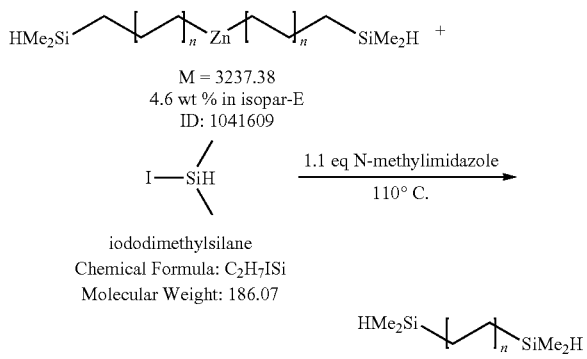

In a nitrogen-filled glovebox, a 1 L jar with a 4.6% suspension of polymeryl zinc in Isopar™ E ($^1$H-NMR Mn=1586 per chain, GPC Mn=1310 per chain) was split roughly equally into two 1 L round bottom flasks. Flask one contained 355 g (16.3 g of polymeryl zinc) and flask two contained 379.7 g (17.5 g of polymeryl zinc). Both flasks were heated to 110° C. in the glovebox until the solutions became homogeneous.

Once the solutions became homogeneous, the following starting materials were added. To flask one was then added 0.91 g of NMI (11.1 mmol, 0.88 mL, 1.1 equiv per chain) and 2.2 g of 87% pure dimethylhydrogeniodosilane (17.5 mmol, 1.1 equiv per chain). To flask two was added 0.97 g of NMI (11.87 mmol, 0.95 mL, 1.1 equiv per chain) and 2.37 g (11.87 mmol, 1.1 equiv per chain) of 87% pure dimethylhydrogeniodosilane. The flasks were heated at 110° C. for 45 minutes, after which an aliquot was removed for NMR analysis to confirm the disappearance of the C—Zn species. After this was confirmed and a total of 1.5 h of heating, the solutions in the jars were cooled to room temperature. The solutions were then each poured into a stirring beaker of methanol (1 L). The precipitate was collected in a disposable plastic fritted filter and dried overnight in a vacuum oven at 40° C.

The precipitate was then transferred to two 1 L round bottom flasks and dissolved in 200 mL of toluene at 110° C. Then, 80 mL of deionized water as added to the flask and stirred vigorously with a reflux condenser and a blanket of nitrogen. After at least 10 minutes of stirring, the stirring was stopped and the two phases were allowed to separate. Using a pipette, the aqueous layer was removed as much as possible and discarded. This process was repeated three more times for a total of four washings. After the fourth wash, the flasks were cooled to room temperature and precipitated from a stirring solution of methanol (1 L each). The precipitate was washed with methanol and then dried in a vacuum oven at 40° C. overnight.

30.55 g of telechelic HMe$_2$Si-terminated polyethylene was isolated (90% yield). Mn measured by $^1$H-NMR of the functionalized material including chain ends after accounting for the percentage of dead chains was 1427. The Mn of only the polyethylene segment of functionalized chains was 1307. A signal at 0.97 ppm with triplet multiplicity was attributed to methyl-terminated chain ends that correspond to 13.5% dead chain ends. GPC Mn=1280, Mw=1670, and Đ=1.28.

In this example 12, to an oven-dried 1 L round bottom flask and stir bar was added 55.28 g (18.96 mmol, 2.25 equiv.) of an SiH-terminated poly(ethylene-co-octene) (M$_n$ 2672 g/mol, effective M$_n$ by SiH 2916 g/mol, 2.70 mol % octene by $^{13}$C-NMR). The flask was brought into a glovebox. Then, in a 150 mL jar was weighed out 57.4 g (8.43 mmol, 1 equiv.) of a 50 wt % solution of bis-silanol terminated PDMS (M$_n$ 3130 g/mol by GPC) in toluene, dried over molecular sieves. The solution was poured into the round bottom flask and washed out with several rinses of toluene to total approximately 350 mL of toluene. A Stevens condenser was affixed to the flask and the flask was heated to 100° C. A solution of tris(pentafluorophenyl)borane (52.5 mg, 0.09 mmol, 0.5 mol %) in 3 mL of toluene was prepared. After heating at 100° C. for 1.5 h, the flask contained a slightly hazy solution, but no chunks of polymer remained. Then, 0.5 mL of catalyst solution was added, upon which many bubbles formed. After a minute, the bubble formation slowed and a further 2 mL was added in three portions. A small amount of bubbling continued. After 1.5 hours, an aliquot was removed, dried down under a flow of nitrogen on a hot plate set at 125° C., dissolved in tetrachloroethane, and analyzed by NMR. NMR indicated the complete absence of SiH.

The material was removed from the glovebox and poured into a tared steel pan. Polymer that remained on the inside of the flask was washed out into the pan. The pan was covered with aluminum foil and placed in a fume hood to dry overnight.

Then the pan was moved into a vacuum oven set at 55° C. over the weekend. 83.10 g of material was isolated as a white solid. Conventional GPC appeared to show some remaining PDMS, so the material was redissolved in ~350 mL of toluene at 100° C. and then cooled to room temperature. The slush was then added into a stirring solution of isopropanol (1 L) and precipitated. The mixture formed a milky solution. In order to isolate the polymer, the mixture was poured into a 1 L container and centrifuged at 3000 rpm for 30 minutes. This process was completed in three batches. The supernatant was decanted through a disposable plastic frit. The compacted polymer was then poured out into the frit and dried. Residual polymer was washed out from the centrifuge container with small volumes of isopropanol and air was pulled through the filter cake for at least an hour, or, until the majority of the liquid was collected. Then, the plastic frit was covered and placed in a vacuum oven overnight at 55° C. High temperature liquid chromatography of the final material showed that the mixture contained 0.9 wt % free PDMS. The resulting composition showed 63.1% polyolefin in the triblock copolymer.

Definitions and Usage of Terms

All amounts, ratios, and percentages are by weight unless otherwise indicated by the context of the specification. The amounts of all starting materials in a composition total 100% by weight. The Brief Summary of the Invention and the Abstract are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 1 to 20 includes not only the range of 1 to 20 including endpoints, but also 1, 2, 3, 4, 6, 10, and 20 individually, as well as any other number subsumed in the range. Furthermore, disclosure of a range of, for example, 1 to 20 includes the subsets of, for example, 1 to 3, 2 to 6, 10 to 20, and 2 to 10, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup hydrogen, alkyl and aryl; the subgroup hydrogen and alkyl; and any other individual member and subgroup subsumed therein.

"Periodic Table of the Elements" refers to the Periodic Table of the Elements published in the CRC Handbook of Chemistry and Physics, 68th Edition, by CRC Press, Inc., 1987. Any reference to a Group or Groups means the Group or Groups reflected in this Periodic Table of the Elements using the IUPAC system for numbering groups.

The term "comprise" and derivatives thereof (e.g., comprising, comprises) means including and is not intended to exclude the presence of any additional component, starting material, step or procedure, whether or not the same is expressly recited herein.

The term "hydrocarbyl" means groups containing only hydrogen and carbon atoms, including branched or unbranched, saturated or unsaturated, cyclic or noncyclic groups. Monovalent hydrocarbyl groups include alkyl including cycloalkyl, alkenyl, alkadienyl, cycloalkenyl, cycloalkadienyl, aryl, and alkynyl groups.

The term "telechelic" refers to a reactive polymer and means that the reactive polymer possesses reactive functional groups at the chain ends, where the polymer chain ends may have either the same or different reactive functional groups. As used herein, either one, both, or neither of A) the silyl terminated polyolefin and B) the polydiorganosiloxane may be telechelic.

The following abbreviations are used throughout the specification.

TABLE X

Abbreviations.

| Abbreviation | Definition |
| --- | --- |
| ° C. | Degrees Celsius |
| Da | Daltons or g/mol |
| DMAP | 4-(dimethylamino) pyridine |
| DMF | N,N-dimethylformamide |
| DMPU | 1,3-dimethyl-3,4,5,6-tetrahydro-2-pyrimidinone |
| DP | degree of polymerization |
| Et | ethyl |
| FW | formula weight |
| g | grams |
| GPC | gel permeation chromatography, which can be measured as described in Reference Example 1 |
| hr | hours |
| iPr | iso-propyl |
| IR | infra-red |
| L | liter |
| Me | methyl |
| mg | milligrams |
| min | minutes |
| mL | Milliliter |
| mmol | millimoles |
| Mn | number average molecular weight. Mn for polydiorganosiloxanes may be measured by size exclusion chromatography (commercial GPC technique) Mn of silyl terminated polyolefins and of the polyolefin polydiorganosiloxane block copolymers produced herein may be measured by the method of Reference Example 1, described above. |
| mol | mole |
| Mw | Weight average molecular weight as measured by size exclusion chromatography (commercial technique gel permeation chromatography (GPC) |
| NMI | N-methyl imidazole |
| NMR | Nuclear magnetic resonance |
| PDMS | polydimethylsiloxane |
| PE | polyethylene |
| ppm | parts per million by weight |
| RT | Room temperature of 20° C. to 25° C. |
| THF | Tetrahydrofuran |
| TMAF | Tetramethyammonum fluoride |
| TMEDA | Tetramethylenediamine |
| μ | micro |
| μL | microliters |
| Vi | Vinyl |

Embodiments of the Invention

In a first embodiment, a method for preparing a polyolefin-polydiorganosiloxane block copolymer comprises:
1) combining starting materials comprising A) a silyl terminated polyolefin having 1 to 2 terminal silyl groups per molecule, where the terminal silyl group has formula

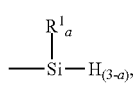

where each $R^1$ is an independently selected monovalent hydrocarbyl group and each subscript a is independently 1 or 2;

B) a polydiorganosiloxane having 1 to 2 polydiorganosiloxane having 1 to 2 hydrolyzable substituents capable of undergoing reaction with a silicon bonded hydrogen atom; and C) a Lewis Acid catalyst.

In a second embodiment, in the method of the first embodiment, A) the silyl terminated polyolefin has unit formula:

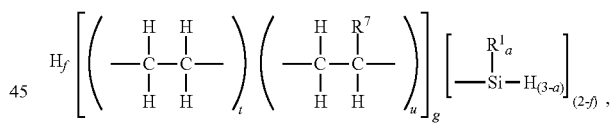

where subscript f is 0 to 1, and subscripts t and u have relative values such that $0<t\leq 1$, $0\leq u\leq 1$, subscript $g\geq 1$, and each $R^7$ is independently a monovalent hydrocarbyl group of 2 to 20 carbon atoms.

In a third embodiment, in the method of the second embodiment, subscript g is 1 to 500.

In a fourth embodiment, in the method of the third embodiment, subscript g is 10 to 400.

In a fifth embodiment, in the method of the fourth embodiment, subscript g is 18 to 360.

In a sixth embodiment, in the method of any one of the first to fifth embodiments, the silyl terminated polyolefin is silyl terminated polyethylene or silyl terminated poly(ethylene/octene) copolymer.

In a seventh embodiment, in the method of any one of the preceding embodiments, starting material B) comprises a polydiorganosiloxane of formula (B1):

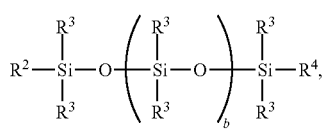

where each $R^2$ is independently a hydrolyzable substituent, each $R^3$ is independently a hydrogen atom or a monovalent organic group free of hydrolyzable functionality, $R^4$ is selected from $R^2$ and $R^3$, and subscript $b \geq 0$.

In an eighth embodiment, in the method of the seventh embodiment, each $R^2$ is OH.

In a ninth embodiment, in the method of the seventh or eighth embodiment, each $R^3$ is selected from alkyl and aryl, alternatively methyl and phenyl.

In a tenth embodiment, in the method of the seventh or eighth embodiment, subscript b is 2 to 2,000.

In an eleventh embodiment, in the method of any one of the first through the tenth embodiments, any one of conditions A) to D) is met, where:

Condition A) is that the silyl terminated polyolefin has one terminal silyl group per molecule, Condition B) is that the silyl terminated polyolefin has two terminal silyl groups per molecule, Condition C) is that the polyorganosiloxane has one hydrolyzable substituent per molecule, and Condition D) is that the polyorganosiloxane has two hydrolyzable substituents per molecule.

In a twelfth embodiment, in the method of the eleventh embodiment, any one of conditions E) to I) is met, where Condition E) means both condition A) and condition C),
Condition F) means both condition A) and condition D),
Condition G) means both condition B) and condition C),
Condition H) means all three of A), B), and D), and
Condition I) means all three of B), C), and D).

When condition H) is met, both a silyl terminated polyolefin having one terminal silyl group per molecule and a silyl terminated polyolefin having two terminal silyl groups per molecule are used. The resulting copolymer in this embodiment may have $(AB)_n$ architecture. When Condition I) is met, both a polyorganosiloxane having one hydrolyzable substituent per molecule and a polyorganosiloxane having two hydrolyzable substituents per molecule are used. The resulting copolymer in this embodiment may have $(AB)_n$ architecture. Alternatively, when any one of conditions D), H), and I) is met, then an alkoxysilyl-functional organosilicon compound having at least one silicon bonded hydrogen atom may be included in the starting materials, and an alkoxy functional polyolefin-polydiorganosiloxane may be synthesized.

In a thirteenth embodiment, in any one of the first through twelfth embodiments, the starting materials further comprise one or more additional starting materials selected from the group consisting of D) a solvent, E) an alkoxysilyl-functional organosilicon compound having at least one silicon bonded hydrogen atom, and both D) and E).

In a fourteenth embodiment, a copolymer is prepared by the method of any one of the first through twelfth embodiments.

In a fifteenth embodiment, the copolymer comprises unit formula (I):

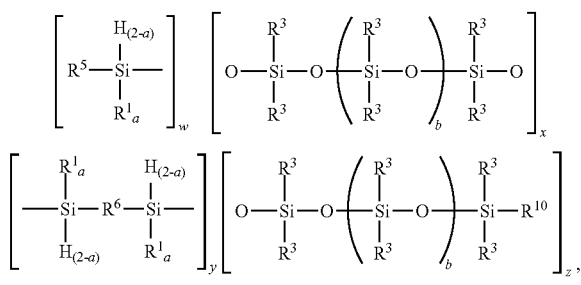

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefin, each $R^6$ is an independently selected divalent polyolefin, each $R^{10}$ is independently selected from $R^3$ and an alkoxysilyl functional hydrocarbylene containing group, each subscript a is independently 1 or 2, each subscript b is independently 0 or a positive number; subscript w is 0 to 2, subscript x is 0 or a positive number, subscript y is 0 or a positive number, subscript z is 0 to 2, a quantity $(w+y) \geq 1$, a quantity $(x+z) \geq 1$, with the proviso that when subscript w is 0, subscript z is >0 and when subscript z=0, subscript w>0.

In a sixteenth embodiment, a copolymer has formula (IV):

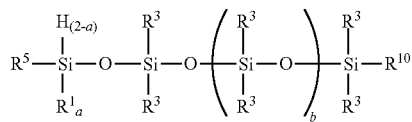

where each $R^1$ is an independently monovalent hydrocarbyl group, each $R^3$ is independently selected from a hydrogen atom or a monovalent organic group free of hydrolyzable functionality, subscript a is 1 or 2, subscript $b \geq 0$, each $R^5$ is an independently selected hydrogen terminated polyolefinic block, each $R^{10}$ is independently selected from $R^3$ and an alkoxysilyl functional hydrocarbylene containing group, each subscript a is independently 1 or 2, and subscript $b \geq 0$.

In a seventeenth embodiment, in the copolymer of formula (IV) in the sixteenth embodiment, each $R^1$ is methyl, each $R^3$ is methyl, each $R^5$ is selected from hydrogen terminated polyethylene and hydrogen terminated poly(ethylene/octene), each $R^6$ is selected from polyethylene and poly(ethylene/octene), each subscript a=1, and each subscript b is 2 to 2,000.

In an eighteenth embodiment, a copolymer has formula (V):

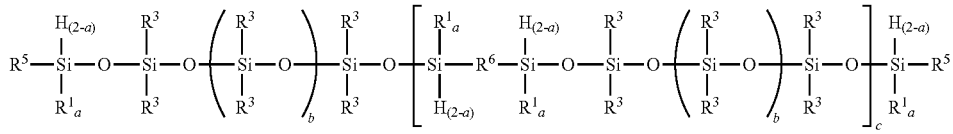

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefin, each $R^6$ is an independently selected divalent polyolefin, each subscript a is independently 1 or 2, each subscript $b \geq 0$, and subscript c is 1 to 1,000.

In a nineteenth embodiment, in the copolymer of formula (V) in the eighteenth embodiment, each $R^1$ is methyl, each $R^3$ is methyl, each $R^5$ is selected from hydrogen terminated polyethylene and hydrogen terminated poly(ethylene/octene), each $R^6$ is selected from polyethylene and poly(ethylene/octene), each subscript a=1, each subscript b is 2 to 2,000, and subscript c is 1 to 100.

In a twentieth embodiment, a copolymer has formula (VI):

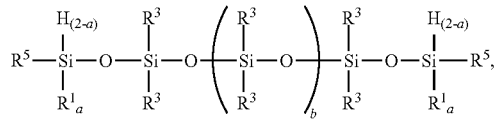

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefinic block, each $R^6$ is an independently selected divalent polyolefinic block, each subscript a is independently 1 or 2, and subscript b 0.

In a twenty-first embodiment, in the copolymer of formula (VI) in the twentieth embodiment, each $R^1$ is methyl, each $R^3$ is methyl, each $R^5$ is selected from hydrogen terminated polyethylene and hydrogen terminated poly(ethylene/octene), each subscript a=1, and each subscript b is 2 to 2,000.

In a twenty-second embodiment, a copolymer has formula (VII):

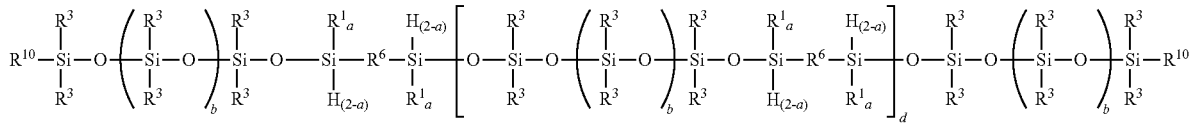

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefin, each $R^6$ is an independently selected divalent polyolefin, each $R^{10}$ is independently selected from $R^3$ and an alkoxysilyl functional hydrocarbylene containing group, each subscript a is independently 1 or 2, each subscript $b \geq 0$, and subscript d is 1 to 1,000.

In a twenty-third embodiment, in the copolymer of formula (VII) in the twenty-second embodiment, each $R^1$ is methyl, each $R^3$ is methyl, each $R^5$ is selected from hydrogen terminated polyethylene and hydrogen terminated poly(ethylene/octene), each $R^6$ is selected from polyethylene and poly(ethylene/octene), each subscript a=1, each subscript b is 2 to 2,000, and subscript d is 1 to 100.

In a twenty-fourth embodiment, a copolymer has formula (VIII):

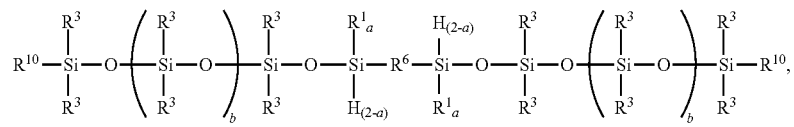

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefinic block, each $R^6$ is an independently selected divalent polyolefinic block, each $R^{10}$ is independently selected from $R^3$ and an alkoxysilyl functional hydrocarbylene containing group, each subscript a is independently 1 or 2, and each subscript b≥0.

In a twenty-fifth embodiment, in the copolymer of formula (VIII) in the twenty fourth embodiment, each $R^1$ is methyl, each $R^3$ is methyl, each $R^6$ is selected from polyethylene and poly(ethylene/octene), each subscript a=1, and each subscript b is 2 to 2,000.

The invention claimed is:

1. A method for preparing a polyolefin-polydiorganosiloxane block comprising:
   optionally pre-1) preparing a silyl terminated polyolefin having 1 to 2 terminal silyl groups per molecule, where the terminal silyl group has formula

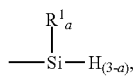

where each $R^1$ is an independently selected monovalent hydrocarbyl group and subscript a is 1 or 2,
by a process comprising
   i) combining starting materials comprising
      a polymeryl-metal,
      optionally b) a nitrogen containing heterocycle, and
      c) a halosilane, and
      optionally d) a solvent; thereby forming a product comprising the silyl-terminated polyolefin;
   optionally ii) washing the product with water, thereby removing unwanted materials comprising starting material b); and
   optionally iii) recovering the silyl terminated polyolefin, wherein A) the silyl terminated polyolefin, has unit formula (A3):

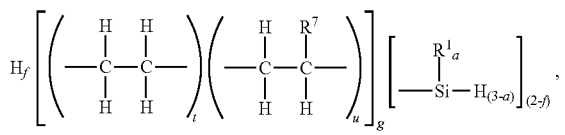

where subscript f is 0 to 1, and subscripts t and u have relative values such that 0<t≤1, 0≤u≤1, subscript g is 1 or more, and each $R^7$ is independently a monovalent hydrocarbyl group of 2 to 20 carbon atoms; and
   1) combining starting materials comprising:
      A) the silyl terminated polyolefin,
      B) a substantially linear polydiorganosiloxane having 1 to 2 hydrolyzable substituents capable of undergoing reaction with a silicon bonded hydrogen atom; and
      C) a Lewis Acid catalyst;
      optionally D) a solvent; and
      optionally E) an alkoxysilyl-functional organosilicon compound having at least one silicon bonded hydrogen atom.

2. The method of claim 1, where B) the polydiorganosiloxane has formula (B1):

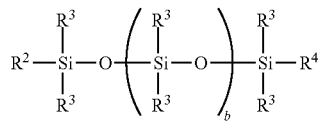

where each $R^2$ is independently a hydrolyzable substituent, each $R^3$ is independently a hydrogen atom or a monovalent organic group free of hydrolyzable functionality, $R^4$ is selected from $R^2$ and $R^3$, and subscript b is 0 or a positive number.

3. The method of claim 2, where each $R^2$ is a hydroxyl group, each $R^3$ is an alkyl or an aryl group, and subscript b is 2 to 2,000.

4. The method of claim 1, where C) the Lewis Acid catalyst is selected from the group consisting of $(C_5F_4)(C_6F_5)_2B$; $(C_5F_4)_3B$; $(C_6F_5)BF_2$;
   $BF(C_6F_5)_2$; $B(C_6F_5)_3$; $BCl_2(C_6F_5)$; $BCl(C_6F_5)_2$; $B(C_6H_5)(C_6F_5)_2$;
   $B(C_6H_5)_2(C_6F_5)$; $[C_6H_4(mCF_3)]_3B$; $[C_6H_4(pOCF_3)]_3B$; $(C_6F_5)B(OH)_2$;
   $(C_6F_5)_2BOH$; $(C_6F_5)_2BH$; $(C_6F_5)BH_2$; $(C_7H_{11})B(C_6F_5)_2$; $(C_8H_{14})B(C_6F_5)$;
   $(C_6F_5)_2B(OC_2H_5)$; and $(C_6F_5)_2B—CH_2CH_2Si(CH_3)$.

5. The method of claim 4, where C) is tris(pentafluorophenyl)borane.

6. The method of claim 1, where any one of conditions A) to D) is met, where:
   Condition A) is that the silyl terminated polyolefin has one terminal silyl group per molecule,
   Condition B) is that the silyl terminated polyolefin has two terminal silyl groups per molecule,
   Condition C) is that the polyorganosiloxane has one hydrolyzable substituent per molecule, and,
   Condition D) is that the polyorganosiloxane has two hydrolyzable substituents per molecule.

7. The method of claim 6, where one of conditions E) to I) is met, where
   Condition E) means both condition A) and condition C),
   Condition F) means both condition A) and condition D),
   Condition G) means both condition B) and condition C),
   Condition H) means all three of A), B), and D), and
   Condition I) means all three of B), C), and D).

8. The method of claim 1, where the copolymer has unit formula

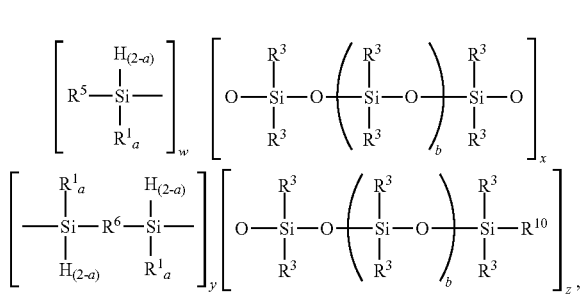

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefin, each $R^6$ is an independently selected divalent polyolefin, each $R^{10}$ is independently selected from $R^3$ and an alkoxysilyl functional hydrocarbylene containing group each subscript a is independently 1 or 2, each subscript b is independently 0 or a positive number; subscript w is 0 to 2, subscript x is 0 or a positive number, subscript y is 0 or a positive number, subscript z is 0 to 2, a quantity $(w+y) \geq 1$, a quantity $(x+z) \geq 1$, with the proviso that when subscript w is 0, subscript z is $>0$ and when subscript z=0, subscript w>0.

9. The method of claim 8, where x=0, y=0, w=1 and z=1, and the copolymer has formula:

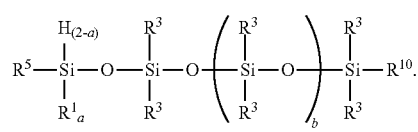

10. The method of claim 8, where w=2, z=0, x≥1, and y≥1, and the copolymer has formula:

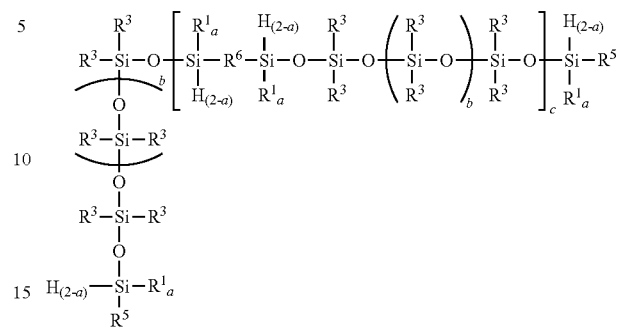

where subscript c≥0.

11. The method of claim 8, where subscript w=2, subscript x=1, subscript y=0 and subscript z=0, and the copolymer formula:

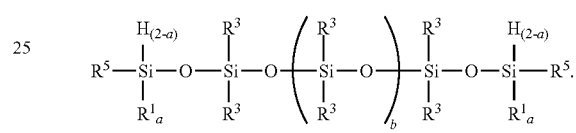

12. The method of claim 8, where z=2, w=0, x≥1, and y≥1, and the copolymer has formula:

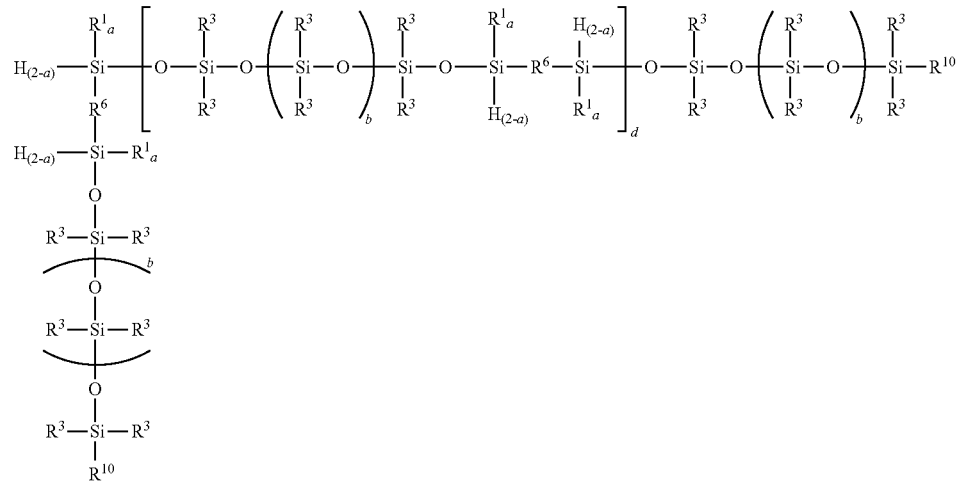

where subscript d≥0.

13. The method of claim 8, where subscript w=0, subscript x=1, subscript y=0 and subscript z=2, and the copolymer has formula:

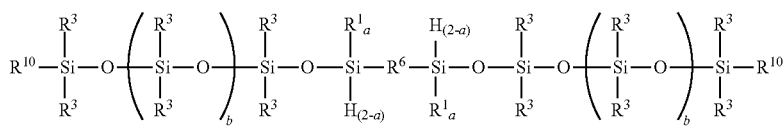

14. The method of claim 8, where the copolymer has at least one instance of $R^{10}$ representing an alkoxysilyl functional hydrocarbylene containing group with a formula selected from:

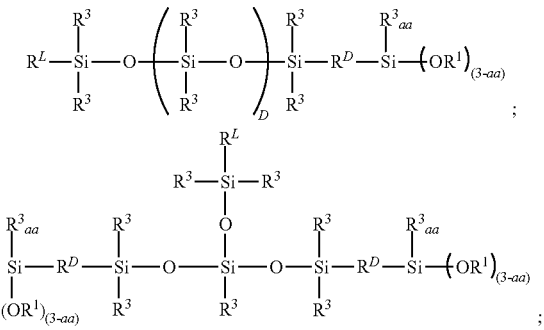

one or both of

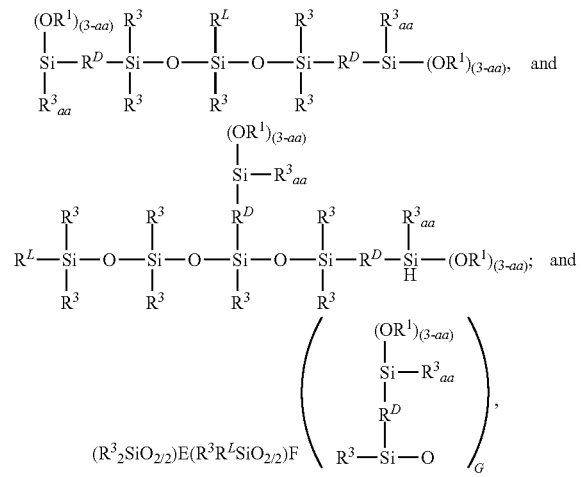

where each $R^L$ is an oxygen atom, each $R^D$ is independently a divalent hydrocarbyl group of 2 to 18 carbon atoms; each subscript aa is independently 0, 1, or 2; subscript D is 0 to 20; E is 0 or more, subscript F is 1 or more, and subscript G is 1 or more and $4 \leq (E+F+G) \leq 50$.

15. The method of claim 1, further comprising, forming A) the polyolefin having the silyl terminal group before step 1) by a method comprising:
   a) combining starting materials comprising i) an olefin monomer, ii) a catalyst, and iii) a chain shuttling agent to prepare a polymeryl-metal;
   b) combining iii) the polymeryl-metal and iv) a halosilane;
   where steps a) and b) are performed in a solution in a continuous reactor, thereby forming a mixture comprising A) the polyolefin having the silyl terminal group of formula (A1), unreacted i) olefin monomer, and v) solvent; and
   c) using the mixture to deliver starting material A) in step 1).

16. The method of claim 1, where C) the Lewis Acid catalyst contains boron.

17. A method for preparing a polyolefin-polydiorganosiloxane block copolymer comprising:

optionally pre-1) preparing a silyl terminated polyolefin having 1 to 2 terminal silyl groups per molecule, where the terminal silyl group has formula

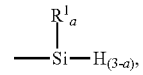

where each $R^1$ is an independently selected monovalent hydrocarbyl group and subscript a is 1 or 2,
   by a process comprising
      i) combining starting materials comprising
         a) a polymeryl-metal,
         optionally b) a nitrogen containing heterocycle, and
         c) a halosilane, and
         optionally d) a solvent; thereby forming a product comprising the silyl-terminated polyolefin;
      optionally ii) washing the product with water, thereby removing unwanted materials comprising starting material b); and
      optionally iii) recovering the silyl terminated polyolefin, wherein the silyl terminated polyolefin has unit formula (A2):

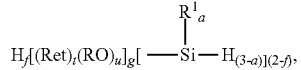

where subscript f is 0 to 1, subscripts t and u have relative values such that $0 < t \leq 1$, $0 \leq u \leq 1$, subscript g is 1 or more, each $R^{et}$ represents an ethylene unit, and each $R^O$ represents an olefin unit, other than ethylene; and
   1) combining starting materials comprising:
      A) the silyl terminated polyolefin,
      B) a substantially linear polydiorganosiloxane, where B) the polydiorganosiloxane has formula (B1):

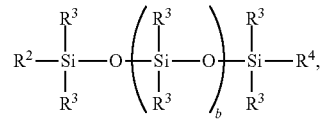

where each $R^2$ is a hydroxyl group, each $R^3$ is independently an alkyl or an aryl group, $R^4$ is selected from $R^2$ and $R^3$, and subscript b is 2 to 2,000;
      C) a Lewis Acid catalyst;
         optionally D) a solvent; and
         optionally E) an alkoxysilyl-functional organosilicon compound having at least one silicon bonded hydrogen atom.

18. The method of claim 17, where C) the Lewis Acid catalyst contains boron.

19. The method of claim 17, where C) the Lewis Acid catalyst is selected from the group consisting of $(C_5F_4)$ $(C_6F_5)_2B$; $(C_5F_4)_3B$; $(C_6F_5)BF_2$;
$BF(C_6F_5)_2$; $B(C_6F_5)_3$; $BCl_2(C_6F_5)$; $BCl(C_6F_5)_2$; $B(C_6H_5)$ $(C_6F_5)_2$;
$B(C_6H_5)_2(C_6F_5)$; $[C_6H_4(mCF_3)]_3B$; $[C_6H_4(pOCF_3)]_3B$; $(C_6F_5)B(OH)_2$;
$(C_6F_5)_2BOH$; $(C_6F_5)_2BH$; $(C_6F_5)BH_2$; $(C_7H_{11})B(C_6F_5)_2$; $(C_8H_{14})B(C_6F_5)$;
$(C_6F_5)_2B(OC_2H_5)$; and $(C_6F_5)_2B-CH_2CH_2Si(CH_3)$.

20. The method of claim 19, where C) is tris(pentafluorophenyl)borane.

* * * * *